US009293078B2

(12) United States Patent
Shin et al.

(10) Patent No.: US 9,293,078 B2
(45) Date of Patent: *Mar. 22, 2016

(54) DISPLAY DEVICE INTEGRATED WITH TOUCH SCREEN PANEL AND METHOD OF DRIVING THE SAME

(71) Applicant: LG Display Co., Ltd., Seoul (KR)

(72) Inventors: SeungRok Shin, Goyang-si (KR); DeukSu Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/863,217

(22) Filed: Sep. 23, 2015

(65) Prior Publication Data

US 2016/0012766 A1   Jan. 14, 2016

Related U.S. Application Data

(63) Continuation of application No. 14/788,577, filed on Jun. 30, 2015, which is a continuation of application No. 14/476,277, filed on Sep. 3, 2014, now Pat. No. 9,098,161.

(60) Provisional application No. 61/919,118, filed on Dec. 20, 2013.

(30) Foreign Application Priority Data

Jan. 17, 2014 (KR) .................... 10-2014-0006350

(51) Int. Cl.
*G06F 3/045* (2006.01)
*G09G 3/20* (2006.01)
(Continued)

(52) U.S. Cl.
CPC .............. *G09G 3/2096* (2013.01); *G06F 3/041* (2013.01); *G06F 3/044* (2013.01); *G06F 3/0412* (2013.01);
(Continued)

(58) Field of Classification Search
CPC ..... G06F 3/044; G06F 3/0412; G06F 3/0416; G06F 3/0488
USPC ............. 345/156, 173–178; 178/18.01–18.11
See application file for complete search history.

(56) References Cited

U.S. PATENT DOCUMENTS 8,477,105 B2   7/2013  Haga et al.
8,659,573 B2   2/2014  Haga et al.
(Continued)

FOREIGN PATENT DOCUMENTS

CN   202443218 U   9/2012
CN   202939388 U   5/2013
(Continued)

OTHER PUBLICATIONS

United States Office Action, U.S. Appl. No. 14/476,277, May 20, 2015, thirteen pages.
(Continued)

*Primary Examiner* — Rodney Amadiz
(74) *Attorney, Agent, or Firm* — Fenwick & West LLP

(57) ABSTRACT

A display device integrated with a touch screen panel, and a method of driving the same, can prevent parasitic capacitance that would otherwise increase the load during a touch operation, lower the accuracy of touch sensing, or make touch sensing impossible. The display device includes data lines, gate lines, and a plurality of electrodes spaced apart from each other. A common voltage is applied to the electrodes in a display driving mode and a touch drive signal is applied to one or more of the electrodes in a touch driving mode. A data voltage is applied to the data lines in the display driving mode. A scan signal is supplied sequentially to the gate lines in the display driving mode and the touch drive signal or a signal corresponding to the touch drive signal is applied to one or more of the gate lines in the touch driving mode.

24 Claims, 18 Drawing Sheets

(51) Int. Cl.
*G06F 3/041* (2006.01)
*G06F 3/044* (2006.01)

(52) U.S. Cl.
CPC ........ G06F 3/0416 (2013.01); *G09G 2300/043* (2013.01); *G09G 2310/0208* (2013.01); *G09G 2310/0213* (2013.01); *G09G 2310/08* (2013.01); *G09G 2330/02* (2013.01)

(56) References Cited

U.S. PATENT DOCUMENTS

| | | | |
|---|---|---|---|
| 8,860,432 B2* | 10/2014 | Shen | G06F 3/044 324/613 |
| 9,007,343 B1 | 4/2015 | Ludden | |
| 9,098,161 B2* | 8/2015 | Shin | G06F 3/0412 |
| 2010/0253638 A1 | 10/2010 | Yousefpor et al. | |
| 2012/0182251 A1 | 7/2012 | Krah | |
| 2013/0090873 A1 | 4/2013 | Lundstrum et al. | |
| 2013/0321296 A1 | 12/2013 | Lee et al. | |
| 2015/0002460 A1* | 1/2015 | Lee | G06F 3/0416 345/174 |
| 2015/0091843 A1 | 4/2015 | Ludden | |
| 2015/0309643 A1* | 10/2015 | Morein | G06F 3/0416 345/174 |

FOREIGN PATENT DOCUMENTS

| | | |
|---|---|---|
| EP | 2 267 791 A2 | 12/2010 |
| EP | 2 492 784 A2 | 8/2012 |

OTHER PUBLICATIONS

United States Office Action, U.S. Appl. No. 14/476,277, Nov. 17, 2014, ten pages.
United States Office Action, U.S. Appl. No. 14/788,577, Dec. 31, 2015, eleven pages.
European Patent Office, Search Report and Opinion, European Patent Application No. 14183308.7, May 27, 2015, nine pages.

* cited by examiner

DISPLAY DEVICE INTEGRATED WITH TOUCH SCREEN PANEL AND METHOD OF DRIVING THE SAME

CROSS REFERENCE TO RELATED APPLICATION

This application is a continuation application under 35 U.S.C. §120 of U.S. patent application Ser. No. 14/788,577 filed on Jun. 30, 2015, which is a continuation application under 35 U.S.C. §120 of U.S. patent application Ser. No. 14/476,277 filed on Sep. 3, 2014, now U.S. Pat. No. 9,098,161, which claims priority from and the benefit under 35 U.S.C. §119(e) of U.S. Patent Application No. 61/919,118 filed on Dec. 20, 2013, and under 35 U.S.C. §119(a) of Korean Patent Application Number 10-2014-0006350 filed on Jan. 17, 2014, all of which are hereby incorporated by reference for all purposes as if fully set forth herein.

BACKGROUND

1. Technical Field

The present disclosure relates to a display device integrated with a touch screen panel and a method of driving the same.

2. Description of Related Art

In response to the development of the information society, there is increasing demand for various types of display devices which display images. Currently, various display devices such as liquid crystal displays (LCDs), plasma display panels (PDPs) and organic light-emitting diode displays (OLEDs) are used.

Many display devices are breaking away from conventional input systems, such as a button, a keyboard and a mouse, and providing a touch-based input system which allows users to intuitively and conveniently input information or instructions.

In order to provide the touch-based input system, sensitivity to a touch by a user and the ability to accurately detect the coordinates of the touch are required.

Accordingly, in the related art, touch sensing is provided using one touch sensing method selected from among a variety of touch sensing technologies, such as resistive touch sensing technology, capacitive touch sensing technology, electromagnetic induction technology, infrared (IR) touch sensing technology and ultrasonic touch sensing technology.

Among the variety of touch sensing technologies, capacitive touch sensing technology is most popular. This technology uses a plurality of touch electrodes (e.g. row electrodes and column electrodes) formed on a touch screen panel, and detects a touch and the coordinates of the touch based on a change in capacitance between the touch electrodes or between a pointer such as a finger and the touched electrode(s).

According to the capacitive touch sensing technology, in addition to capacitance necessary for touch sensing, undesirable parasitic capacitance is generated by other voltage lines or electrodes around the touched electrode(s).

The undesirable parasitic capacitance causes certain problems, for example, increasing the load during a touch operation, lowering the accuracy of touch sensing, and in severe cases, making touch sensing impossible.

The problems caused by undesirable parasitic capacitance are more severe in medium-sized or large displays.

In addition, the problems caused by the undesirable parasitic capacitance frequently occur in display devices integrated with a touch screen panel (TSP) in which an in-cell touch screen panel is embedded in a display panel. These problems make it difficult or impossible to produce middle-sized or larger in-cell touch screen panels.

The information disclosed in the Background section is provided only for better understanding of the background of the disclosure and should not be taken as an acknowledgment or any form of suggestion that this information forms a prior art that would already be known to a person skilled in the art.

BRIEF SUMMARY

Various aspects of the present disclosure provide a display device integrated with a touch screen panel and a method of driving the same which can prevent parasitic capacitance that would otherwise increase the load during a touch operation, lower the accuracy of touch sensing, or make touch sensing impossible.

Also provided is a medium-sized or larger display device integrated with a touch screen panel, the production of which was previously impossible due to parasitic capacitance.

In an aspect of the present disclosure, provided is a display device integrated with a touch screen panel. The display device includes: a panel including a plurality of data lines arranged in a first direction, a plurality of gate lines arranged in a second direction, and a plurality of electrodes grouped into a plurality of electrode groups; a touch integrated circuit which applies a touch drive signal to one or more of the plurality of electrodes during a touch driving mode; a data driver unit which supplies a data voltage to the plurality of data lines during a display driving mode; and a gate driver unit which supplies a scan signal sequentially to the plurality of gate lines during the display driving mode. The touch drive signal or a signal corresponding to the touch drive signal is applied to one or more of the plurality of gate lines during the touch driving mode.

During the touch driving mode, the touch drive signal or the signal corresponding to the touch drive signal may be further applied to one or more of the plurality of data lines.

The touch drive signal or the signal corresponding to the touch drive signal may be applied to one or more of the plurality of gate lines through capacitors.

In another aspect of the present disclosure, provided is a display device integrated with a touch screen panel. The display device includes a plurality of electrodes which are spaced apart from each other, wherein a common voltage is applied to the plurality of electrodes in a display driving mode and a touch drive signal is applied to one or more of the plurality of electrodes in a touch driving mode; a plurality of data lines which are arranged in a first direction, wherein a data voltage is applied to the plurality of data lines in the display driving mode; and a plurality of gate lines which are arranged in a second direction, wherein a scan signal is supplied sequentially to the plurality of gate lines in the display driving mode and the touch drive signal or a signal corresponding to the touch drive signal is applied to one or more of the plurality of gate lines in the touch driving mode.

In the touch driving mode, the touch drive signal or the signal corresponding to the touch drive signal may be further applied to one or more of the plurality of data lines.

In a further aspect of the present disclosure, provided is a method of driving a display device integrated with a touch integrated circuit and a touch screen panel, the display device including a panel on which a plurality of data lines and a plurality of gate lines are formed to define a number of pixels and a plurality of common electrodes is formed. The method includes a display driving step of applying a common voltage to the plurality of common electrodes at display driving timing and a touch driving step of applying a touch drive signal to one or more of the plurality of common electrodes and applying the touch drive signal or a signal corresponding to the touch drive signal to one or more of the plurality of gate lines at touch driving timing.

The touch driving step may further apply the touch drive signal or the signal corresponding to the touch drive signal to one or more of the plurality of data lines at touch driving timing.

According to some embodiments, a touch-sensitive display device comprises a display panel comprising a plurality of display pixels, the display pixels driven by a plurality of gate lines and a plurality of data lines. The touch-sensitive display device further comprises a touch screen panel integrated with the display panel, the touch screen panel comprising a plurality of electrodes, the plurality of electrodes driven by a plurality of signal lines. The touch-sensitive display device is configured to operate in a plurality of modes, including a display driving mode and a touch driving mode. During the display driving mode, one or more of the data lines is driven by a data voltage, one or more of the gate lines is driven by a scan signal, and one or more of the signal lines is driven by a common voltage signal. During the touch driving mode, one or more of the signal lines is driven by a touch drive signal, and one or more of the gate lines is driven by a signal having an amplitude range and a phase that mimic, respectively, an amplitude range and a phase of the touch drive signal.

Some embodiments provide a method of driving a touch-sensitive display device comprising a display panel and a touch screen panel integrated with the display panel, the display panel comprising a plurality of display pixels driven by a plurality of gate lines and a plurality of data lines, and the touch screen panel comprising a plurality of electrodes driven by a plurality of signal lines. The method comprises, responsive to the touch-sensitive display device being in a display driving mode: providing a data voltage to one or more of the data lines; providing a scan signal to one or more of the gate lines; and providing a common voltage to one or more of the signal lines. The method further comprises, responsive to the touch-sensitive display device being in a touch driving mode: providing a touch drive signal to one or more of the signal lines; and providing, to one or more of the gate lines, a signal that has an amplitude range and a phase that mimic, respectively, an amplitude range and a phase of the touch drive signal.

According to the present disclosure as set forth above, it is possible to provide the display device integrated with a touch screen panel and the method of driving the same which can prevent parasitic capacitance that would otherwise increase the load during a touch operation, lower the accuracy of touch sensing, or make touch sensing impossible.

In addition, it is possible to provide the medium-sized or large touch screen integrated display device, the production of which has been impossible due to parasitic capacitance.

The methods and apparatuses of the present disclosure have other features and advantages which will be apparent from, or are set forth in greater detail in the accompanying drawings, which are incorporated herein, and in the following Detailed Description, which together serve to explain certain principles of the present disclosure.

DETAILED DESCRIPTION

Figure 1:
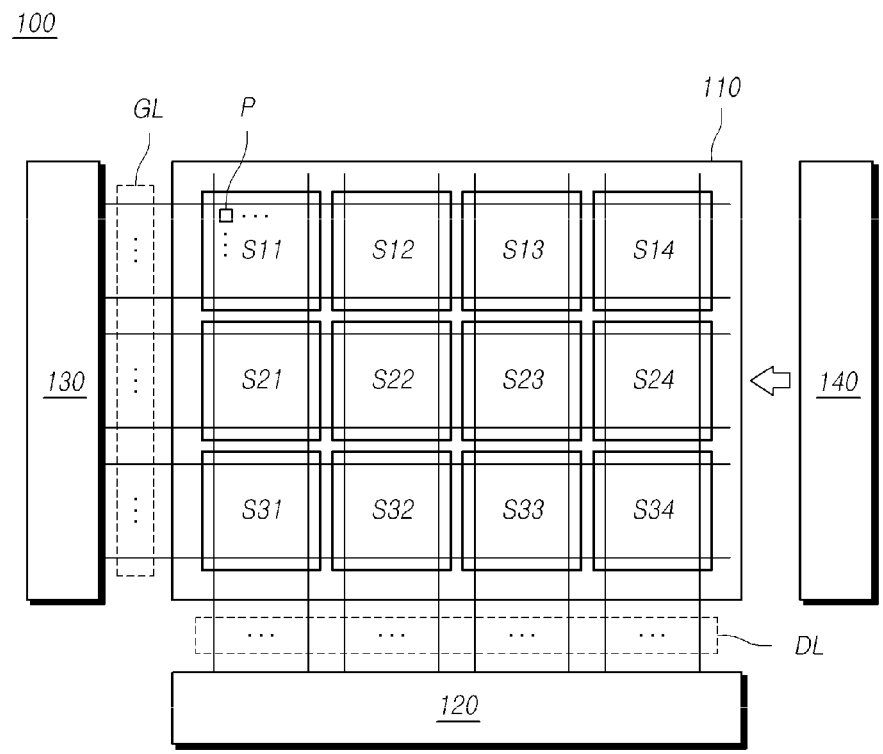
FIG. 1 is a schematic view showing a display device integrated with a touch screen panel according to an exemplary embodiment.

Reference will now be made in detail to the present disclosure, embodiments of which are illustrated in the accompanying drawings. Throughout this document, reference should be made to the drawings, in which the same reference numerals and signs may be used throughout the different drawings to designate the same or similar components. In the following description of the present disclosure, detailed descriptions of known functions and components incorporated herein will be omitted when they may make the subject matter of the present disclosure unclear.

It will be understood that, although terms "first," "second," "A," "B," "(a)," "(b)," etc. may be used herein to describe various elements, these terms are only used to distinguish one element from another element. The substance, sequence, order or number of these elements are not limited by these terms. It will be understood that when an element is referred to as being "connected to" or "coupled to" another element, not only can it be "directly connected" or "coupled to" the other element, but also can it be "indirectly connected or coupled to" the other element via an "intervening" element.

FIG. 1 is a schematic view showing a display device integrated with a touch screen panel (hereinafter referred to as a "touch screen integrated display device") 100 according to an exemplary embodiment.

Referring to FIG. 1, the touch screen integrated display device 100 according to an exemplary embodiment includes a panel 110, a data driver unit 120, a gate driver unit 130 and a touch integrated circuit (IC) 140.

On the panel 110, a plurality of data lines DL is arranged in a first direction (e.g. in a column or in a row), a plurality of gate lines GL is arranged in a second direction (e.g. in a row or in a column), and a plurality of pixels P is respectively defined by a plurality of points where the plurality of data lines DL and the plurality of gate lines GL intersect each other.

A transistor is formed in each pixel area of the plurality of pixels P, in which a source or drain electrode is connected to a corresponding data line of the plurality of data lines DL, a gate electrode is connected to a corresponding gate line of the plurality of gate lines GL, and the drain or source electrode is connected to a pixel electrode.

A plurality of electrodes S11 to S14, S21 to S24 and S31 to S34 is also formed on the panel 110, spaced apart from each other, and is grouped into a plurality of electrode groups.

The panel 110 concurrently functions as a "display panel" and a "touch screen panel (TSP)."

The panel 110 may be referred to a panel in which a display panel and a touch screen panel are integrated together or a display panel in which an in-cell touch screen panel is embedded.

When the panel 110 functions as a display panel, the driving mode of the panel 110 is referred to as "display driving mode." When the panel 110 functions as a touch screen panel, the driving mode of the panel 110 is referred to as "touch driving mode."

When the driving mode of the panel 110 is the display driving mode, the data driver unit 120 supplies a data voltage Vdata which is a displaying application to the plurality of data lines DL.

When the driving mode of the panel 110 is the display driving mode, the gate driver unit 120 supplies a scan signal for a display application sequentially to the plurality of gate lines GL.

When the driving mode of the panel 110 is the touch driving mode, the touch IC 140 applies a touch drive signal to all or parts of the plurality of electrodes S11 to S14, S21 to S24 and S31 to S34 which is directly connected thereto via signal lines. The touch drive signal is also referred to as a touch sensing signal, a touch sensing voltage or a touch drive voltages Vtd.

For example, when the driving mode of the panel 110 is the touch driving mode, the touch IC 140 applies the touch drive signal to all or parts of the plurality of electrode groups into which the plurality of electrodes S11 to S14, S21 to S24 and S31 to S34 is grouped.

The touch screen integrated display device 100 according to an exemplary embodiment can further include a timing controller (not shown) which controls the driving timing of the data driver unit 120 and the gate driver unit 130.

In addition, the touch screen integrated display device 100 according to an exemplary embodiment can further include a touch controller (not shown) which detects a touch, the coordinates of the touch, and the like by receiving sensing data (e.g. capacitance, a change in capacitance or a voltage) measured by the touch IC 140 through the plurality of electrodes S11 to S14, S21 to S24 and S31 to S34 which functions as touch electrodes.

The panel 110 of the touch screen integrated display device 100 according to an exemplary embodiment operates alternately in the display driving mode and the touch driving mode. The timing of the display driving mode and the timing of the touch driving mode can be controlled in response to a control signal outputted from the timing controller, the touch controller or the like, or in some cases, can be controlled through cooperation between the timing controller and the touch controller.

The touch screen integrated display device 100 according to an exemplary embodiment employs capacitive touch sensing technology that detects a touch and the coordinates of the touch based on a change in capacitance using a plurality of touch electrodes (e.g. row electrodes and column electrodes) which are formed on the touch screen panel.

This capacitive touch sensing technology can be divided into, for example, mutual capacitive touch sensing and self-capacitive touch sensing.

According to the mutual capacitive touch sensing that is one example of the capacitive touch sensing technology, electrodes arranged in one direction from among row electrodes and column electrodes function as transmit (Tx) electrodes (also referred to as drive electrodes) to which a drive voltage is applied, and electrodes arranged in the other direction from among row electrodes and column electrodes function as receive (Rx) electrodes (also referred to as sensing electrodes) which sense the drive voltage and generate capacitance together with the Tx electrodes. A touch and the coordinates of the touch are detected based on a change in capacitance (mutual capacitance) between the Tx and Rx electrodes depending on whether or not a pointer such as a finger or pen is present.

According to the self-capacitive touch sensing that is another example of the capacitive touch sensing technology, each touch electrode generates capacitance (self-capacitance) with a pointer such as a finger or pen, values of capacitance between the respective touch electrodes and the pointer such as a finger or pen depending on whether or not the pointer is present, and a touch and the coordinates of the touch are detected based on these values of capacitance. Unlike from the mutual capacitive touch sensing, the self-capacitive touch sensing concurrently applies and senses a drive voltage (touch drive signal) through each touch electrode. Therefore, according to the self-capacitive touch sensing, there is no distinction between Tx electrodes and Rx electrodes.

The touch screen integrated display device 100 according to an exemplary embodiment can employ one of the above-mentioned two types of capacitive touch sensing (the mutual capacitive touch sensing and the self-capacitive touch sensing). However, herein, the embodiment will be described on the assumption that the self-capacitive touch sensing is employed for the sake of explanation.

The above-mentioned data driver unit 120 can include at least one data driver integrated circuit (IC) that is also referred to as a "source driver IC." At least one data driver IC can be connected to bonding pads of the panel 110 by tape automated bonding (TAB) or chip-on-glass (COG) bonding, directly provided on the panel 110, or in some cases, integrated to the panel 110.

The above-mentioned gate driver unit 130 can be positioned at one side of the panel 110, as shown in FIG. 1. The gate driver unit 130 can also be divided into two sections which are positioned at both sides of the panel 110 depending on the driving method.

In addition, the gate driver unit 130 can include at least one gate driver IC which can be connected to bonding pads of the panel 110 by TAB or COG bonding, implemented as a gate-in-panel IC which is directly provided on the panel 110, or in some cases, integrated to the panel 110.

As shown in FIG. 1, the above-mentioned touch IC 140 can be formed outside the data driver unit 120 and the gate driver unit 130 as a component separate from the data driver unit 120 and the gate driver unit 130. Alternatively, the touch IC 140 can be implemented as an internal component of another separate driver IC (e.g. a display driver IC) which can include at least one of the data driver unit 120 and the gate driver unit 130, or as an internal component of the data driver unit 120 or the gate driver unit 130.

Therefore, in the touch driving mode, the application of a touch drive signal from the touch IC 140 to all or parts of the plurality of electrodes which functions as the touch electrodes in the touch driving mode can be considered as the application of the touch drive signal from the separate driver IC including the touch IC 140 to all or parts of the plurality of electrodes. Depending on the design, it can be considered as the application of the touch drive signal from the data driver unit 120 or the gate driver unit 130 including the touch IC 140 to all or parts of the plurality of electrodes which functions as the touch electrodes.

The touch IC 140 is not limited to the above-mentioned implementation or design, but it should be understood that any configuration or an internal or external component thereof, the functions of which are equivalent or similar to those described herein, belongs to this disclosure.

Although the touch IC 140 is shown as being one circuit in FIG. 1, the touch IC 140 can be implemented as two or more circuits or sections.

The touch IC 140 needs a separate signal line configuration connected to each of the plurality of electrodes S11 to S14, S21 to S24 and S31 to S34 in order to apply the touch drive signal to all or parts of the plurality of electrodes S11 to S14, S21 to S24 and S31 to S34.

At least one signal line can be formed on the panel 110 in a first direction (e.g. in a column) or a second direction (e.g. in a row). The least one signal line is connected to each of the plurality of electrodes S11 to S14, S21 to S24 and S31 to S34 to transfer the touch drive signal or a common voltage thereto.

In order to prevent a reduction in the aperture ratio, the least one signal line connected to each of the plurality of electrodes S11 to S14, S21 to S24 and S31 to S34 can be formed, for example, on an area of a second substrate (e.g. a lower substrate or thin-film transistor (TFT) array substrate) of the panel 110 which faces an area of a black matrix formed on a first substrate (e.g. an upper substrate or color filter substrate) of the panel 110.

When the signal line configuration connected to each of the plurality of electrodes S11 to S14, S21 to S24 and S31 to S34 is implemented as two or more signal lines, resistance can be reduced.

Figure 3:
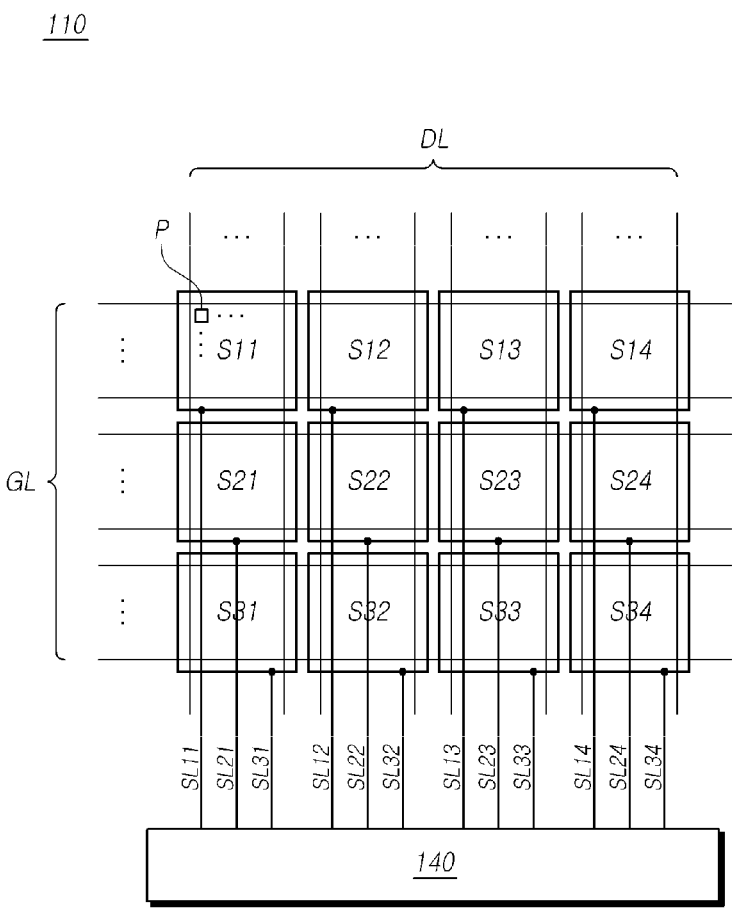
FIG. 3 is a top-plan view showing the panel of the display device integrated with a touch screen panel according to an exemplary embodiment.

The direction of at least one signal line connected to each of the plurality of electrodes S11 to S14, S21 to S24 and S31 to S34 can differ depending on whether sensing is performed by grouping the plurality of electrodes S11 to S14, S21 to S24 and S31 to S34 in the first direction (e.g. in a column) in which the data lines are formed or in the second direction (e.g. in a row) in which the gate lines are formed (see FIG. 3).

If sensing is performed by grouping the plurality of electrodes S11 to S14, S21 to S24 and S31 to S34 in the first direction (e.g. in a column) in which the data lines are formed, at least one signal line connected to each of the plurality of electrodes S11 to S14, S21 to S24 and S31 to S34 can be formed in the first direction (e.g. in a column) in which the data lines are formed (see FIG. 3).

Figure 5:
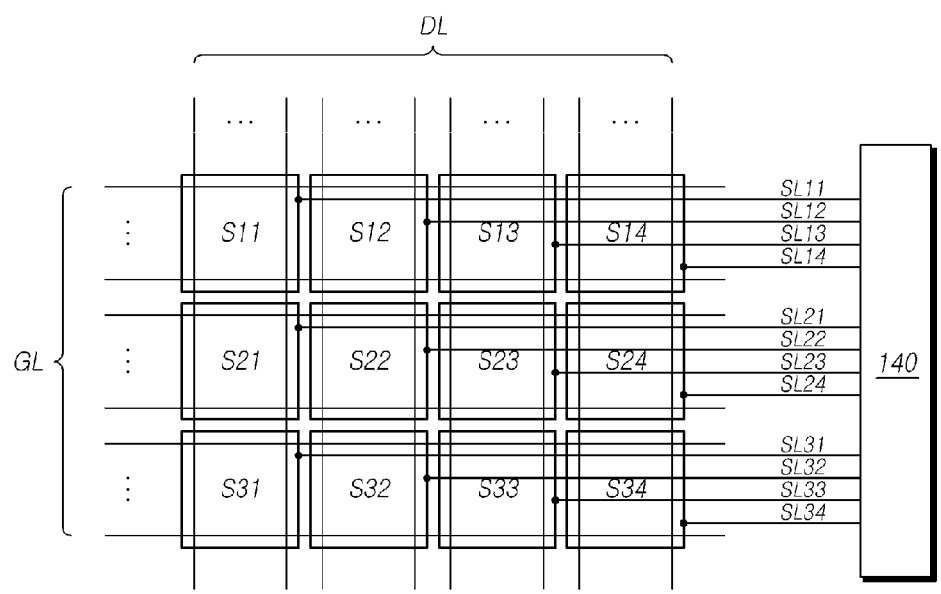
FIG. 5 is a top-plan view showing another example of the panel of the display device integrated with a touch screen panel according to an exemplary embodiment.

If sensing is performed by grouping the plurality of electrodes S11 to S14, S21 to S24 and S31 to S34 in the second direction (e.g. in a row) in which the gate lines are formed, at least one signal line connected to each of the plurality of electrodes S11 to S14, S21 to S24 and S31 to S34 can be formed in the second direction (e.g. in a row) in which the gate lines are formed (see FIG. 5).

The plurality of electrodes S11 to S14, S21 to S24 and S31 to S34 mentioned herein functions as the "touch electrodes" to all or parts of which the touch drive signal is applied when the driving mode is the touch driving mode and as the "common electrodes" to which a common voltage Vcom is applied such that the common electrodes form liquid crystal capacitors together with pixel electrodes formed on the panel when the driving mode is the display driving mode, as described above.

Here, the pixel electrodes and the common electrodes S11 to S14, S21 to S24 and S31 to S34 can be formed on the same substrate such that a lateral electric field is generated between the pixel electrodes and the common electrodes S11 to S14, S21 to S24 and S31 to S34 in the display driving mode.

In this aspect, the touch screen integrated display device 100 according to an exemplary embodiment can be, for example, an in-plane switching liquid crystal display (IPS LCD) which expresses an image on the screen by rotating horizontally-arranged liquid crystal molecules in positions. The IPS LCD has advantages such as increased resolution, lower power consumption and a wide viewing angle. More specifically, the touch screen integrated display device 100 can be an advanced high performance in-plane switching (AH-IPS) LCD.

Figure 2:
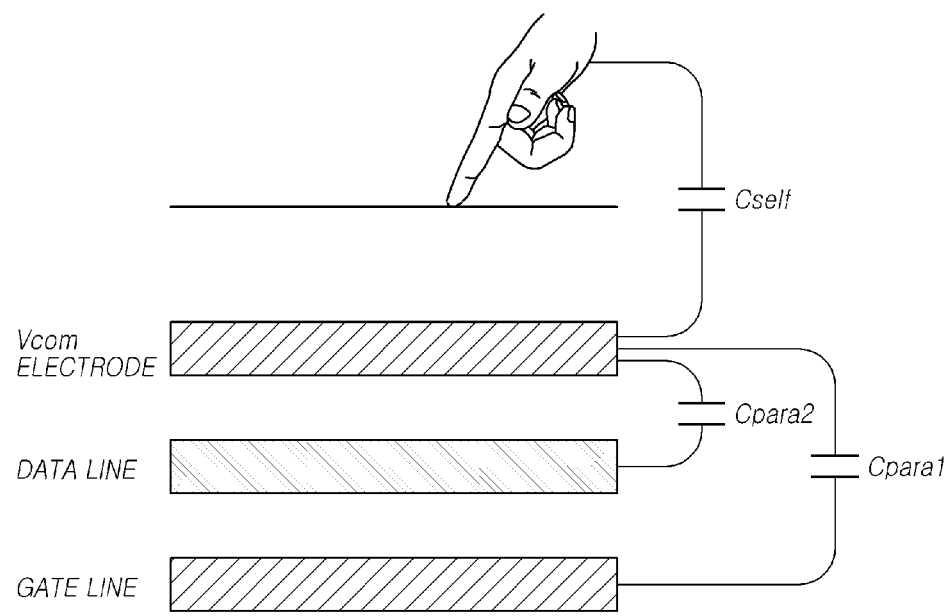
FIG. 2 is a view showing capacitance components occurring in the display device integrated with a touch screen panel according to an exemplary embodiment.

FIG. 2 is a view showing capacitance components Cself, Cpara1 and Cpara2 occurring in the touch screen integrated display device 100 according to an exemplary embodiment.

Referring to FIG. 2, the plurality of electrodes S11 to S14, S21 to S24 and S31 to S34, which functions as the touch electrodes in the touch driving mode and the common electrodes which form liquid crystal capacitors together with the pixel electrodes in the display driving mode, serves to generate capacitance Cself together with a pointer such as a finger or pen in order to detect a touch and the coordinates of the touch in the touch driving mode. The plurality of electrodes S11 to S14, S21 to S24 and S31 to S34 may also generate undesirable parasitic capacitance components Cpara1 and Cpara2 together with a data line DL and a gate line GL in the touch driving mode.

The parasitic capacitance Cpara occurring in the touch driving mode acts as a significant load in the touch operation to lower the accuracy of touch sensing or disable touch sensing. The size of the parasitic capacitance Cpara may increase with the increasing size of the display device 100 or the display panel 110, thereby causing more severe problems in touch sensing.

Therefore, according to this exemplary embodiment, the gate driver unit 130 applies the touch drive signal (touch sensing voltage), which is applied to all or parts of the plurality of electrodes S11 to S14, S21 to S24 and S31 to S34 functioning as the touch electrodes, or a signal (voltage), of which the phase and size are equal to those of the touch drive signal, to the gate line GL in the touch driving mode in order to prevent the undesirable parasitic capacitance component Cpara1 between the plurality of electrodes S11 to S14, S21 to S24 and S31 to S34 functioning as the touch electrodes in the touch driving mode and the gate line GL.

When the touch drive signal (touch sensing voltage), which is applied to all or parts of the plurality of electrodes S11 to S14, S21 to S24 and S31 to S34 functioning as the touch electrodes, or the signal (voltage), of which the phase and size are equal to those of the touch drive signal, is applied to the gate line GL in this manner, a potential difference is not generated between the electrodes functioning as the touch electrodes and the gate line GL, whereby the parasitic capacitance component Cpara1 is not generated between the electrodes functioning as the touch electrodes and the gate line GL.

In addition, the data driver unit 120 can further apply the touch drive signal (touch sensing voltage), which is applied to all or parts of the plurality of electrodes S11 to S14, S21 to S24 and S31 to S34 functioning as the touch electrodes, or a signal (voltage), of which the phase and size are equal to those of the touch drive signal, to the data line DL in order to prevent the undesirable parasitic capacitance component Cpara2 between the plurality of electrodes S11 to S14, S21 to S24 and S31 to S34 functioning as the touch electrodes in the touch driving mode and the data line DL.

When the touch drive signal (touch sensing voltage), which is applied to all or parts of the plurality of electrodes S11 to S14, S21 to S24 and S31 to S34 functioning as the touch electrodes, or the signal (voltage), of which the phase and size are equal to those of the touch drive signal, is further applied to the data line DL in this manner, a potential difference is not generated between the electrodes functioning as the touch electrodes and the data line DL, whereby the parasitic capacitance component Cpara2 is not generated between the electrodes functioning as the touch electrodes and the data line DL.

As described above, in the touch driving mode, the touch drive signal, which is applied to the electrode(s) functioning as the touch electrode(s), or the signal, of which the phase and size are equal to those of the touch drive signal, is applied to all or parts of the plurality of gate lines GL, and in some cases, the touch drive signal (touch sensing voltage), which is applied to the electrode(s) functioning as the touch electrode(s), or the signal, of which the phase and size are equal to those of the touch drive signal, is further applied to all or parts of the plurality of data lines DL, thereby removing an RC load caused by the parasitic capacitance components Cpara1 and Cpara2 that the electrodes functioning as the touch electrodes generate together with the gate lines GL and the data lines DL and improving the level of sensing. In addition, not only small displays but also medium-sized or large displays can be implemented as an in-cell touch screen panel.

More detailed descriptions will be given below of the panel 110 of the touch screen integrated display device 100 according to an exemplary embodiment, the method of applying the common voltage and the touch drive signal to the plurality of electrodes S11 to S14, S21 to S24 and S31 to S34 which functions as both the common electrodes and the touch electrodes, the method of applying the data voltage and the touch drive signal (or the signal corresponding to the touch drive signal) to the data lines DL, the method of applying the scan signal and the touch drive signal (or the signal corresponding to the touch drive signal) to the gate lines GL, etc.

First, a more detailed description will be given of the panel 110 of the touch screen integrated display device 100 according to an exemplary embodiment with reference to FIG. 3 to FIG. 6.

FIG. 3 is a top-plan view showing the panel 110 of the touch screen integrated display device 100 according to an exemplary embodiment.

Referring to FIG. 3, as described above, the panel 110 includes the plurality of data lines DL, the plurality of gate lines GL and the plurality of electrodes S11 to S14, S21 to S24 and S31 to S34.

In addition, the panel 110 can operate in the display driving mode or the touch driving mode, as described above.

In relation to this, the plurality of data lines DL and the plurality of gate lines GL are components with which the panel 110 can function as the display panel.

In addition, the plurality of electrodes S11 to S14, S21 to S24 and S31 to S34 formed on the panel 110 is a component with which the panel 110 can function as both the display panel and the touch screen panel.

Described in more detail, when the panel 110 functions as the display panel, i.e. when the driving mode of the panel 110 is the display driving mode, the plurality of electrodes S11 to S14, S21 to S24 and S31 to S34 functions as the "common electrodes" (hereinafter also referred to as the "Vcom electrodes") which form the liquid crystal capacitors together with the pixel electrodes (not shown) in response to the common voltage Vcom being applied thereto.

When the panel 110 functions as the touch screen panel, i.e. when the driving mode of the panel 110 is the touch driving mode, the plurality of electrodes S11 to S14, S21 to S24 and S31 to S34 forms the capacitors together with the touch pointer (e.g. a finger or a pen) in response to the touch drive voltage applied thereto, and functions as the "touch electrodes" which measure the capacitance of the capacitors which are formed in this manner.

In other words, the plurality of electrodes S11 to S14, S21 to S24 and S31 to S34 functions as the common electrodes (Vcom electrodes) in the display driving mode and the touch electrodes in the touch driving mode.

The plurality of electrodes S11 to S14, S21 to S24 and S31 to S34 is applied with the common voltage Vcom in the display driving mode and the touch drive signal in the touch driving mode.

Thus, as shown in FIG. 3, signal lines SL11 to SL14, SL21 to SL24 and SL31 to SL34 can be connected to the plurality of electrodes S11 to S14, S21 to S24 and S31 to S34 in order to transfer the common voltage or the touch drive signal to the plurality of electrodes S11 to S14, S21 to S24 and S31 to S34.

Accordingly, in the touch driving mode, the touch drive signal Vtd generated from the touch IC 140 is applied to all or parts of the plurality of electrodes S11 to S14, S21 to S24 and S31 to S34 through the signal lines SL11 to SL14, SL21 to SL24 and SL31 to SL34. In the display driving mode, the common voltage Vcom supplied from a common voltage supply (not shown) is applied to the plurality of electrodes S11 to S14, S21 to S24 and S31 to S34 through the signal lines SL11 to SL14, SL21 to SL24 and SL31 to SL34.

Referring to FIG. 3, pixels P are defined respectively corresponding to points where the plurality of data lines DL and the plurality of gate lines GL formed on the panel 110 intersect each other. Here, each pixel can be one pixel from among red (R), green (G) and blue (B) pixels.

Referring to FIG. 3, two or more pixels P can be defined in an area (hereinafter also referred to as a unit touch electrode area) where each of the plurality of electrodes S11 to S14, S21 to S24 and S31 to S34 functioning as the common electrodes and the touch electrodes is formed. That is, one electrode from among the plurality of electrodes S11 to S14, S21 to S24 and S31 to S34 corresponds to two or more pixels P.

For example, a 24*3 number of data lines DL and 24 gate lines GL can be arranged in one area (unit touch electrode area) where each of the plurality of electrodes S11 to S14, S21 to S24 and S31 to S34 functioning as the common electrodes and the touch electrodes is formed, thereby defining a 24*3*24 number of pixels P.

Each of the plurality of electrodes S11 to S14, S21 to S24 and S31 to S34 functioning as the common electrodes and the touch electrodes can be a block-shaped pattern, as shown in FIG. 3, or in some cases, a pattern including finger-shaped portions.

Figure 17:
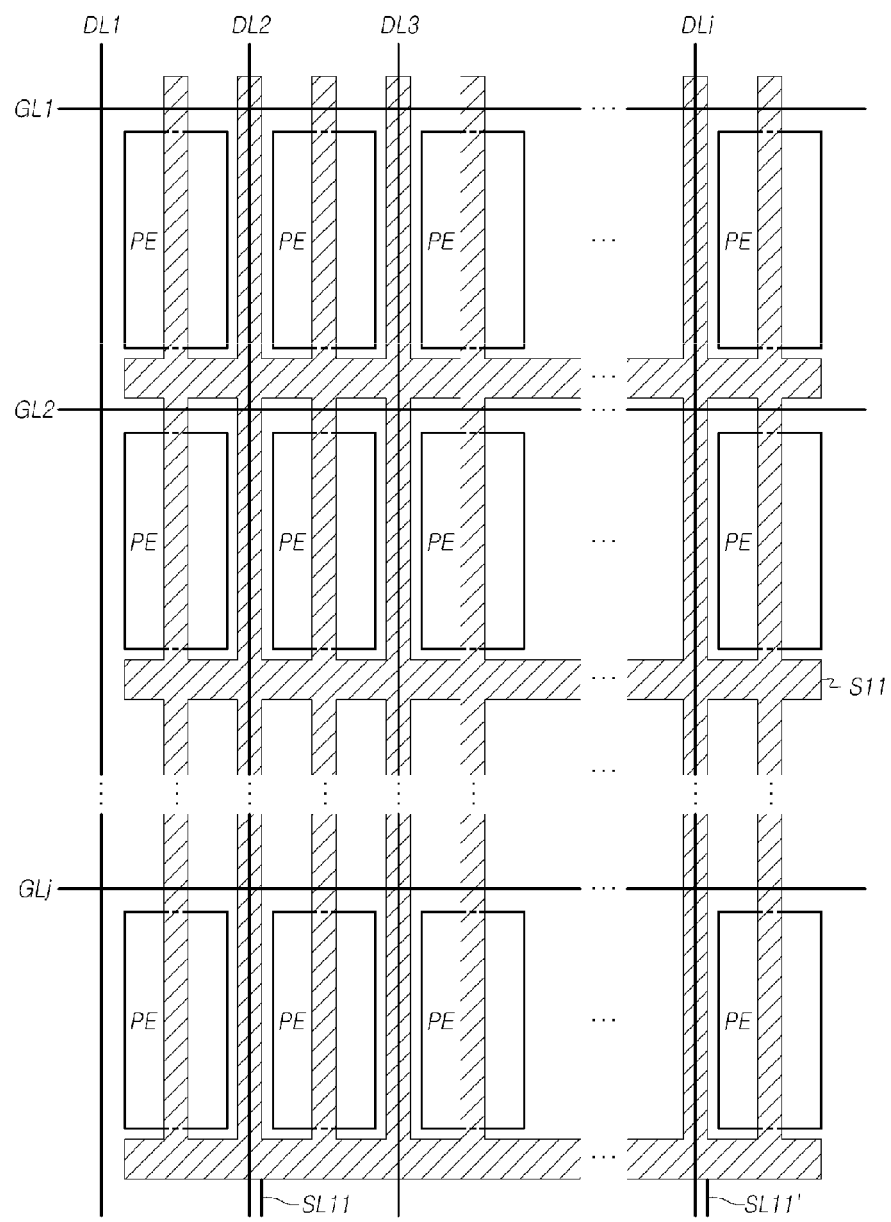
FIG. 17 is a top-plan view showing a unit touch electrode area in the display device integrated with a touch screen panel according to an exemplary embodiment, when each of the plurality of electrodes functioning as the touch electrodes is a pattern including finger-shaped portions.
Figure 18:
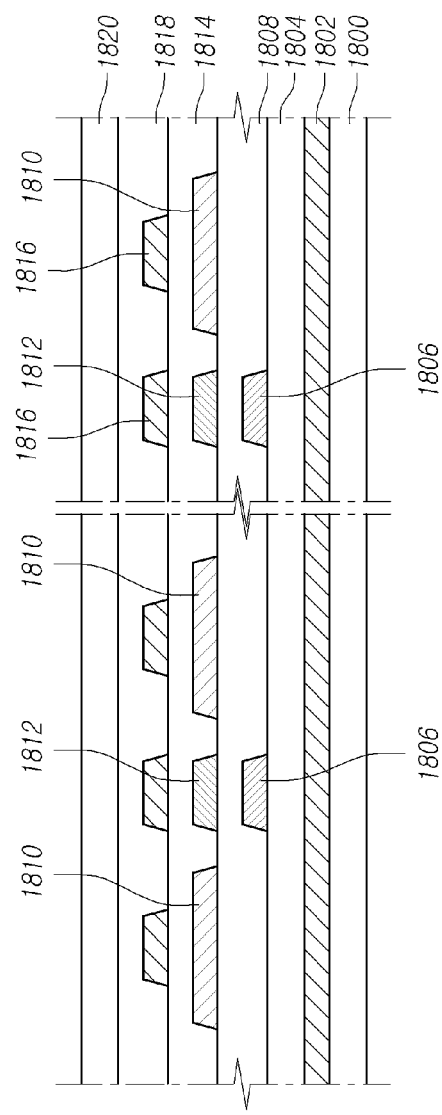
FIG. 18 is a cross-sectional view showing a unit touch electrode area in the display device integrated with a touch screen panel according to an exemplary embodiment, when each of the plurality of electrodes functioning as the touch electrodes is a pattern including finger-shaped portions.

The case in which each of the plurality of electrodes S11 to S14, S21 to S24 and S31 to S34 functioning as the common electrodes and the touch electrodes is the pattern including the finger-shaped portions can be discussed by referring the top-plan view of FIG. 17 and the cross-sectional view of FIG. 18.

Although the plurality of electrodes functioning as the touch electrodes and the common electrodes mentioned herein is shown in the several figures as being 12 electrodes which are arranged in the shape of a 3*4 matrix containing 3 rows and 4 columns, this is only illustrative for the convenience of description. The plurality of electrodes functioning as both the touch electrodes and the common electrodes can be arranged into a various shapes of matrix and in various numbers in consideration of, for example, the size of the touch screen integrated display device 100 and the panel 110 and the design criteria of the touch system.

Figure 4:
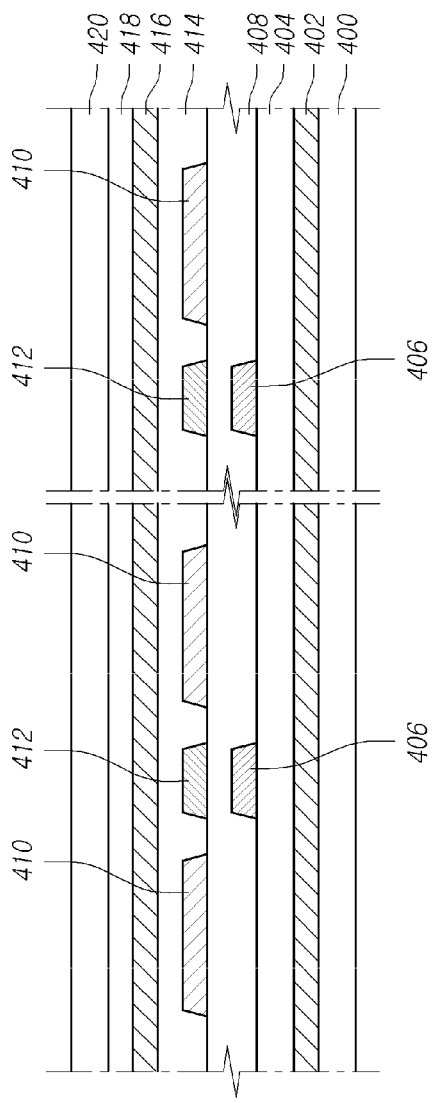
FIG. 4 is a cross-sectional view showing the panel of the display device integrated with a touch screen panel according to an exemplary embodiment.

FIG. 4 is a view illustrating the cross-section of the panel 110 of the touch screen integrated display device 100 according to an exemplary embodiment.

FIG. 4 shows the cross-section taken from an area (unit touch electrode area) where one electrode from among the plurality of electrodes S11 to S14, S21 to S24 and S31 to S34 functioning as the common electrodes and the touch electrodes is formed.

Referring to FIG. 4, in the panel 110 of the touch screen integrated display device 100, for example, a gate line 402 is formed in the second direction (in a row, which is in the right and left direction in FIG. 4) on a lower substrate 400, and a gate insulating layer 404 is formed thereon.

A data line 406 is formed in the first direction (in a column, which is in the direction perpendicular to the paper surface in FIG. 4) on the gate insulating layer 404, and a first passivation layer 408 is formed thereon.

Pixel electrodes 410 of each pixel area and signal lines 412 are formed on the first passivation layer 408, and a second passivation layer 414 can be formed thereon. The signal lines 412 are respectively connected from the plurality of electrodes S11 to S14, S21 to S24 and S31 to S34 functioning as the common electrodes and the touch electrodes to the touch IC 140 to transfer a common voltage Vcom generated from the common voltage supply (not shown) to the plurality of electrodes S11 to S14, S21 to S24 and S31 to S34 in the display driving mode and a touch drive signal generated from the touch IC 140 to the plurality of electrodes S11 to S14, S21 to S24 and S31 to S34 in the touch driving mode.

One electrode 416 functioning as common and touch electrodes is formed on the second passivation layer 414, and a liquid crystal layer 418 is formed thereon. The electrode 416 functioning as the common and touch electrodes is one electrode from among the plurality of electrodes S11 to S14, S21 to S24 and S31 to S34, and can be a block-shaped pattern.

An upper substrate 420 on which a black matrix, a color filter and the like are to be formed is positioned on the liquid crystal layer 418.

FIG. 5 is a top-plan view showing another example of the panel 110 of the touch screen integrated display device 100 according to an exemplary embodiment.

Referring to FIG. 5, unlike in FIG. 3, the signal lines SL11 to SL14, SL21 to SL24 and SL31 to SL34 which are respectively connected to the plurality of electrodes S11 to S14, S21 to S24 and S31 to S34 to transfer a touch drive signal or a common voltage can be arranged parallel to the second direction (e.g. in a row) in which the gate lines GL are arranged.

In this case, the touch drive signal generated from the touch IC 140 or the common voltage generated or supplied from the common voltage supply (not shown) can be transferred to all or parts of the plurality of electrodes S11 to S14, S21 to S24 and S31 to S34 through the signal lines SL11 to SL14, SL21 to SL24 and SL31 to SL34 which are arranged parallel to the gate lines.

Figure 6:
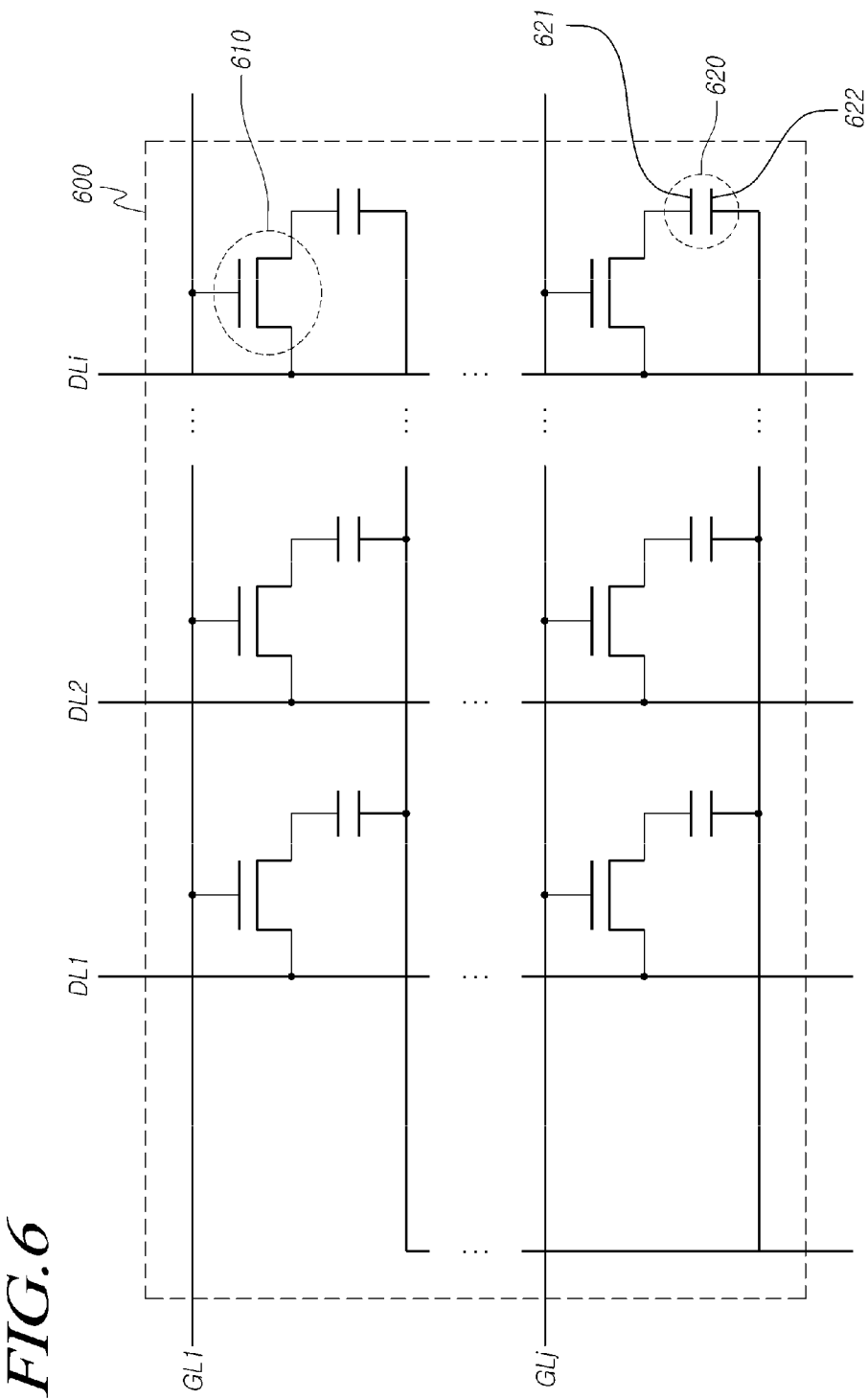
FIG. 6 is a view showing an equilibrium circuit in a unit touch electrode area in the panel of the display device integrated with a touch screen panel according to an exemplary embodiment.

FIG. 6 shows an equilibrium circuit in each unit touch electrode area 600 in the panel 110 of the touch screen integrated display device 100 according to an exemplary embodiment.

Referring to FIG. 6, a plurality of pixels is defined in the unit touch electrode area 600 in the panel 110 of the touch screen integrated display device 100 according to an exemplary embodiment.

Referring to FIG. 6, an i number of data lines DL1 to DLi and a j number of gate lines GL1 to GLj are formed in the unit touch electrode area 600, thereby defining an i*j number of unit pixels (sub-pixels).

Referring to FIG. 6, a transistor 610 is disposed in each of pixel areas (unit pixel area). In the transistor 610, a source electrode (or a drain electrode) is connected to a data line (one data line from among the data lines DL1 to DLi), a gate electrode is connected to a gate line (one gate line from among the gate lines GL1 to GLj), and a drain electrode (or a source electrode) is connected to a pixel electrode 621.

Referring to FIG. 6, the pixel electrode 621 connected to the drain electrode (or source electrode) of the transistor 610 disposed in each of the pixel areas forms a liquid crystal capacitor 620 together with another electrode 622.

The other electrode 622 in each of the pixel areas as mentioned above is one electrode from among the plurality of electrodes S11 to S14, S21 to S24 and S31 to S34 to which a common voltage Vcom is applied.

Hereinafter, a description will be given of a method of driving the touch screen integrated display device 100 according to an exemplary embodiment with reference to FIG. 7 and FIG. 8. Referring to FIG. 9 to FIG. 16, more detailed description will be given of a method of applying a common voltage and a touch drive signal to the plurality of electrodes S11 to S14, S21 to S24 and S31 to S34 functioning as both the common electrodes and the touch electrodes, a method of applying a data voltage and a touch drive signal (or a signal corresponding to the touch drive signal) to the data lines DL, and a method of applying a scan signal and a touch drive signal (or a signal corresponding to the touch drive signal) to the gate lines GL.

Figure 7:
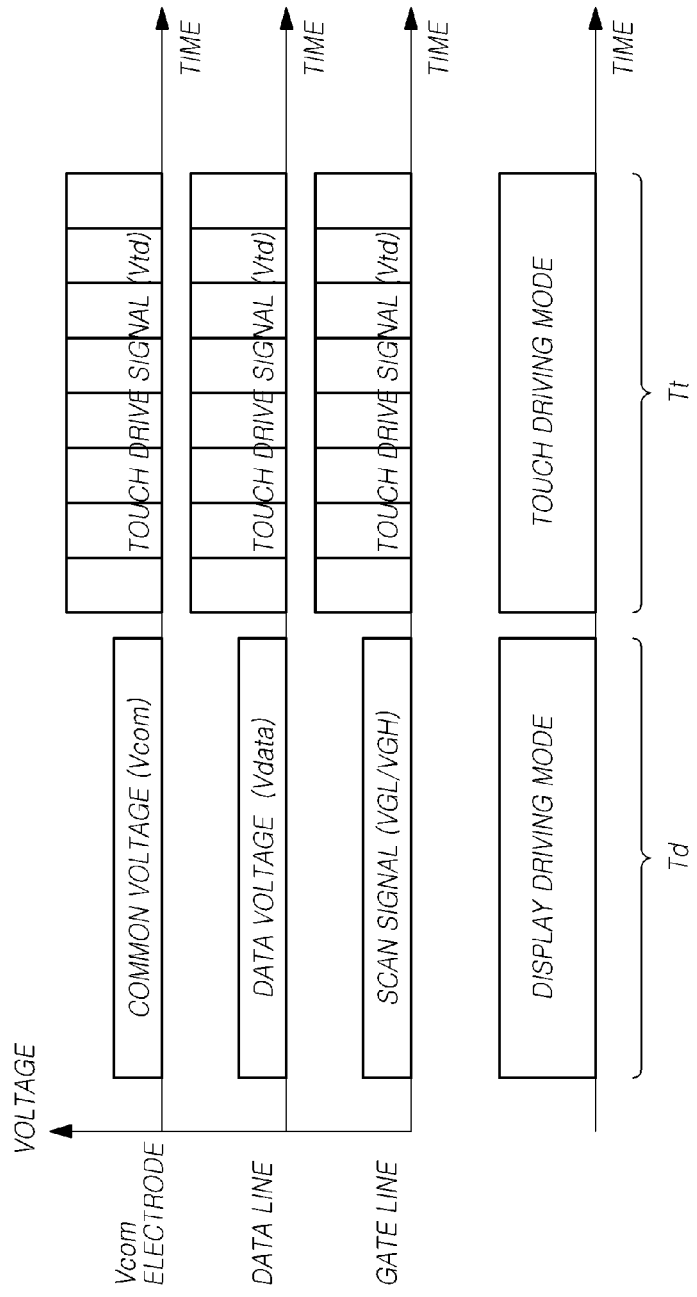
FIG. 7 is a view illustrating a method of driving a display device integrated with a touch screen panel according to an exemplary embodiment.

FIG. 7 is a view illustrating a method of driving the touch screen integrated display device 100 according to an exemplary embodiment.

Referring to FIG. 7, the touch screen integrated display device 100 according to an exemplary embodiment can operate alternately in the display driving mode and the touch driving mode. In some cases, the touch screen integrated display device 100 can operate only in one mode from among the display driving mode and the touch driving mode for a specific time.

Referring to FIG. 7, the operating time Td of the display driving mode and the operating time Tt of the touch driving mode can be set such that the operating times are the same or one time is longer than the other time. In some cases, the operating time Td of the display driving mode and the operating time Tt of the touch driving mode can be set such that the operating times adaptively change depending on the current situation of the touch screen integrated display device 100.

Referring to FIG. 7, the method of fabricating the touch screen integrated display device 100 according to an exemplary embodiment basically includes a display driving step and a touch driving step. The display driving step includes applying a common voltage Vcom to the plurality of common electrodes (Vcom electrodes) S11 to S14, S21 to S24 and S31 to S34, supplying a corresponding data voltage Vdata to each of the plurality of data lines DL, and supplying a corresponding scan signal VGL or VGH sequentially to each of the plurality of gate lines GL at display driving timing. The touch driving step includes applying a touch drive voltage Vtd to all or parts of the plurality of common electrodes (Vcom electrodes) S11 to S14, S21 to S24 and S31 to S34 and further applying the touch drive signal Vtd or a signal corresponding to the touch drive signal Vtd (a voltage, of which the phase and size are the same as those of the touch drive signal Vtd) to all or parts of the plurality of gate lines GL at touch driving timing. In some embodiments, a signal having an amplitude range (e.g., a peak-to-peak amplitude range) that mimics an amplitude range of the touch drive signal Vtd is applied to the gate lines GL1 to GLj. Alternatively, or in addition, a signal having a phase that mimics a phase of the touch drive signal Vtd may be applied to the gate lines GL1 to GLj. For example, the signal applied to the gate lines GL1 to GLj is substantially in-phase with the touch drive signal Vtd.

At the touch driving step, it is possible to further apply the touch drive signal Vtd or the signal corresponding to the touch drive signal Vtd (the signal, of which the phase and size are the same as those of the touch drive signal Vtd) to all or parts of the plurality of data lines. In some embodiments, a signal having an amplitude range (e.g., a peak-to-peak amplitude range) that mimics an amplitude range of the touch drive signal Vtd is applied to the data lines. Alternatively, or in addition, a signal having a phase that mimics a phase of the touch drive signal Vtd may be applied to the data lines. For example, the signal applied to the data lines is substantially in-phase with the touch drive signal Vtd.

Figure 8:
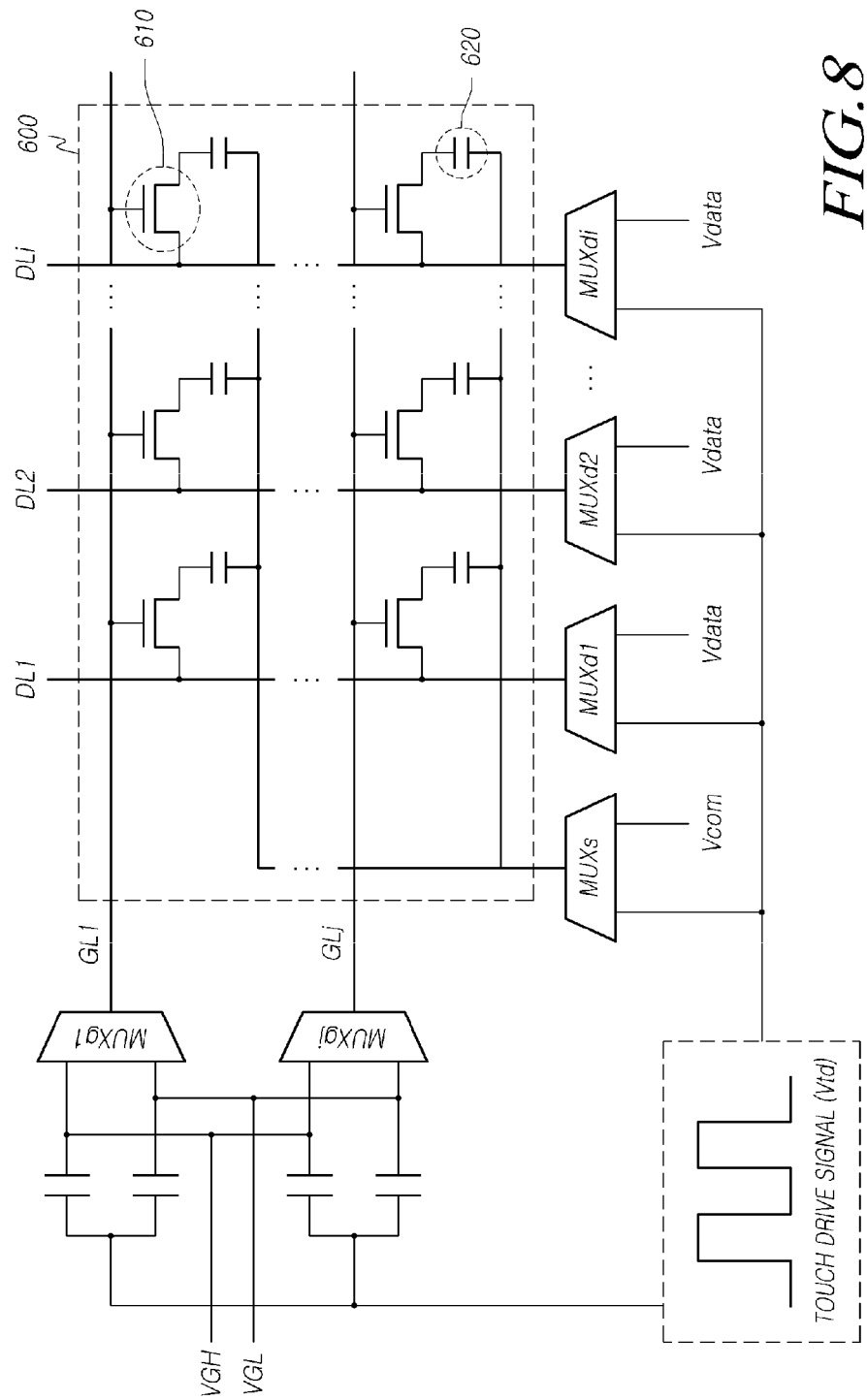
FIG. 8 is an equilibrium circuit view in one unit touch electrode area illustrating a method of supplying a variety of voltages in relation to the method of driving a display device integrated with a touch screen panel according to an exemplary embodiment.

FIG. 8 is an equilibrium circuit view in one unit touch electrode area 600 illustrating a method of supplying a variety of voltages (a common voltage Vcom, a data voltage Vdata, a scan signal VGH/VGL, and a touch drive signal Vtd) in relation to the method of driving the touch screen integrated display device 100 according to an exemplary embodiment.

Referring to FIG. 8, an i number of data lines DL1 to DLi and a j number of gate lines GL1 to GLj extend through each unit touch electrode area 600 corresponding to the area where one electrode from among the plurality of electrodes S11 to S14, S21 to S24 and S31 to S34 is formed.

Therefore, referring to FIG. 8, an i*j number of pixels P is defined in one unit touch electrode area 600 corresponding to the area where one electrode from among the plurality of electrodes S11 to S14, S21 to S24 and S31 to S34 is formed.

In addition, referring to FIG. 8, one transistor 610 is disposed in each pixel area of the pixels P, and one liquid crystal capacitor 620 is defined in the display driving mode.

First, a description will be given of the application (supply) of a variety of signals (a data voltage, a scan signal and a common voltage) when the driving mode is the display driving mode.

Referring to FIG. 8, when the driving mode is the display driving mode, the data driver unit 120 supplies a corresponding data voltage Vdata (also referred to as a "pixel voltage") to the i number of data lines DL1 to DLi through an i number of data line multiplexers MUXd1 to MUXdi.

Referring to FIG. 8, when the driving mode is the display driving mode, the gate driver unit 130 supplies a turn-on voltage level scan signal (e.g. VGH) to one gate line from among the j number of gate lines GL1 to GLj and a turn-off voltage level scan signal (e.g. VGL) to the remaining gate lines through a j number of gate line multiplexers MUXg1 to MUXgj, thereby sequentially driving the j number of gate lines GL1 to GLj.

Referring to FIG. 8, when the driving mode is the display driving mode, for example, the common voltage supply supplies a common voltage Vcom to all of the plurality of electrodes S11 to S14, S21 to S24 and S31 to S34, which includes the electrode S11 corresponding to the unit touch electrode area 600, through a common electrode (or touch electrode) multiplexer MUXs of the data driver unit 120.

Next, a description will be given of the application (supply) of a variety of signals (a touch drive signal) when the driving mode is the touch driving mode.

Referring to FIG. 8, when the driving mode is the touch driving mode, the touch IC 140 supplies a touch drive signal Vtd to the electrode S11 corresponding to the unit touch electrode area 600 as required through, for example, the touch electrode (or common electrode) multiplexer MUXs of the data driver unit 120.

In addition, referring to FIG. 8, when the driving mode is the touch driving mode, the gate driver unit 130 supplies the touch drive signal Vtd, which is applied to the electrode S11 functioning as the touch electrode, or a waveform signal, of which the phase and voltage are the same as those of the touch drive signal Vtd, to the j number of gate lines GL1 to GLj as required through the j number of gate line multiplexers MUXg1 to MUXgj.

At this time, the touch drive signal Vtd or the waveform signal, of which the phase and voltage are the same as those of the touch drive signal Vtd, is applied to the j number of gate lines GL1 to GLj through the capacitors such that the corresponding pixels stay in the turn-off state.

In some embodiments, a signal having an amplitude range (e.g., a peak-to-peak amplitude range) that mimics an amplitude range of the touch drive signal Vtd is applied to the gate lines GL1 to GLj. For example, the signal applied to the gate lines GL1 to GLj has the same or substantially the same amplitude range as the amplitude range of the touch drive signal Vtd. Alternatively, the signal applied to the gate lines GL1 to GLj has an amplitude range that is scaled relative to the amplitude range of the touch drive signal Vtd, by a specified scaling constant. In other words, the amplitude range of the signal applied to the gate lines GL1 to GLj is proportional to the amplitude range of the touch drive signal Vtd.

Alternatively, or in addition, a signal having a phase that mimics a phase of the touch drive signal Vtd is applied to the gate lines GL1 to GLj. For example, the signal applied to the gate lines GL1 to GLj is substantially in-phase with the touch drive signal Vtd.

In addition, referring to FIG. 8, when the driving mode is the touch driving mode, the data driver unit 120 supplies the touch drive signal Vtd, which is applied to the electrode S11 functioning as the touch electrode, or the waveform signal, of which the phase and voltage are the same as those of the touch drive signal Vtd, to the i number of data lines DL1 to DLi as required through the i number of data line multiplexers MUXd1 to MUXdi.

The j number of gate line multiplexers MUXg1 to MUXgj shown in FIG. 8 can be implemented as one gate line multiplexer.

In this case, the gate line multiplexer receives the turn-on voltage level scan signal VGH, the turn-off voltage level VGL, a voltage (e.g. VGL+ΔV/2) obtained by adding a change in voltage (e.g. ΔV/2) to a specific voltage (e.g. VGL) and a voltage (e.g. VGL−ΔV/2) obtained by deducing the change in voltage (e.g. ΔV/2) from the specific voltage (e.g. VGL). In some embodiments, ΔV corresponds to an amplitude range (e.g., a peak-to-peak amplitude range) of the touch drive signal Vtd. In such embodiments, the change in voltage (e.g., ΔV/2) corresponds to half the peak-to-peak amplitude range of the touch drive signal Vtd. Alternatively, ΔV may be proportional to an amplitude range (e.g., a peak-to-peak amplitude range) of the touch drive signal Vtd.

Accordingly, in the display driving mode, the gate line multiplexer selectively outputs one signal selected from among the turn-on voltage level scan signal VGH and the turn-off voltage level scan signal VGL to the j number of gate lines GL1 to GLj.

In addition, in the touch driving mode, the gate line multiplexer can output the touch drive signal Vtd, which can be expressed by the voltage (e.g. VGL+ΔV/2) obtained by adding the change in voltage (e.g. ΔV/2) to the specific voltage (e.g. VGL) and the voltage (e.g. VGL−ΔV/2) obtained by deducing the change in voltage (e.g. ΔV/2) from the specific voltage (e.g. VGL), to all or parts of the j number of gate lines GL1 to GLj.

In other words, by alternately selecting outputs VGL+ΔV/2 or VGL−ΔV/2 during the touch drive mode, the gate line multiplexer generates a pulse waveform that toggles between VGL+ΔV/2 and VGL−ΔV/2. As explained above, if ΔV corresponds to an amplitude range (e.g., a peak-to-peak amplitude range) of the touch drive signal Vtd, then this generated pulse waveform has the same peak-to-peak amplitude range (ΔV) as the touch drive signal, but has a DC offset of VGL relative to the touch drive signal.

Thus, in such embodiments, the signal provided to the gate lines corresponds to the touch drive signal or a signal proportional to the touch drive, but with a DC offset. The DC offset is provided by a DC voltage, such as VGL. Stated differently, the DC offset (e.g., VGL) is added to the touch drive signal or to a signal proportional to the touch drive signal to obtain the signal provided to the gate lines.

Owing to the DC offset, in some embodiments, the signal provided to the gate lines in the touch driving mode turns off the transistors (e.g., transistors 610 illustrated in FIG. 6) disposed within the display pixels that are driven by the gate lines. For example, due to the DC offset, a magnitude of the signal provided to the gate lines is insufficient to turn on the transistors of the pixels during the touch drive mode. For example, a magnitude of the signal provided to the gate lines is lower than a magnitude of the threshold voltage of the transistors. For example, for NMOS transistors, a negative DC voltage offset may be provided so that the signal applied to the gate electrodes in the touch drive mode mimics the touch drive signal (e.g., in phase and amplitude range), but is lower in amplitude than the threshold voltage of the NMOS transistors. Similarly, if the pixels are provided with PMOS transistors, the signal provided to the gate during touch drive mode may be greater than a threshold voltage required to turn on the PMOS transistors.

Thus, by turning off the display pixels during touch driving mode, display functionality of the panel is inhibited during the touch driving mode despite the signal being provided to the gate lines. However, since the signal provided to the gate lines mimics the touch drive signal (e.g., in amplitude range and/or phase), the effects of parasitic capacitance (Cpara1 shown in FIG. 2) between the gate lines and the electrodes can still be mitigated.

Referring to FIG. 9 to FIG. 12, a description will be given below of a method of applying a touch drive signal Vtd to the plurality of electrodes S11 to S14, S21 to S24 and S31 to S34 functioning as the touch electrodes when the driving mode is the touch driving mode.

Figure 9:
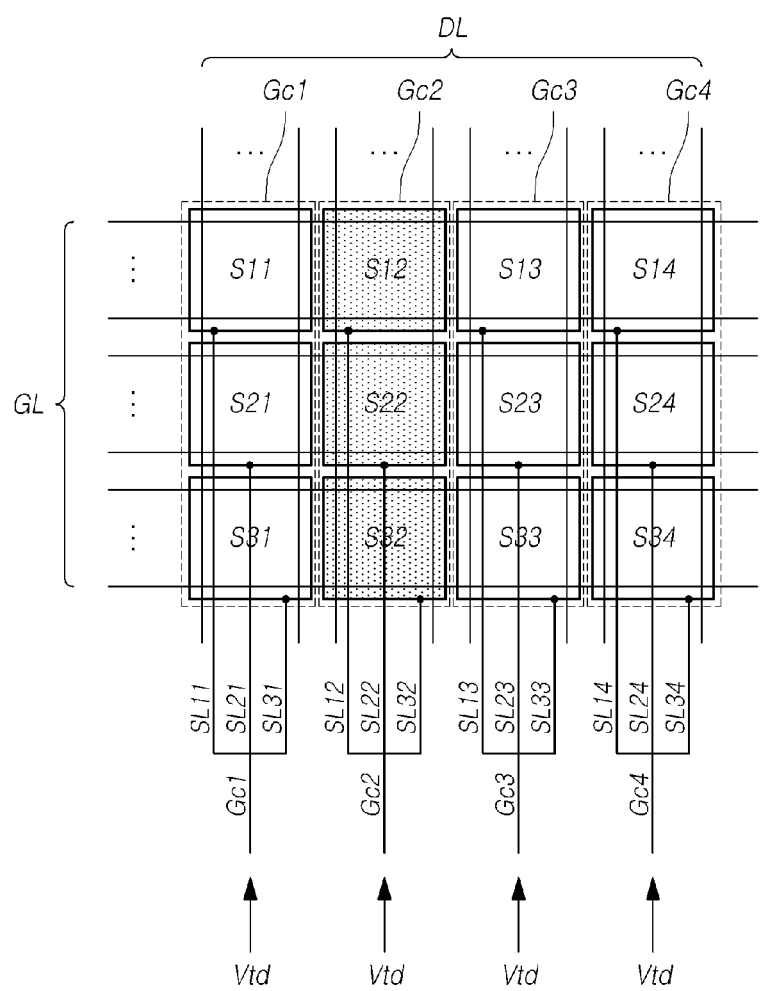
FIG. 9 and FIG. 10 are views showing a method of applying a touch drive signal to touch electrodes in the display device integrated with a touch screen panel according to an exemplary embodiment, when touch sensing is performed according to the touch electrode columns (column-wise touch electrode groups)
Figure 10:
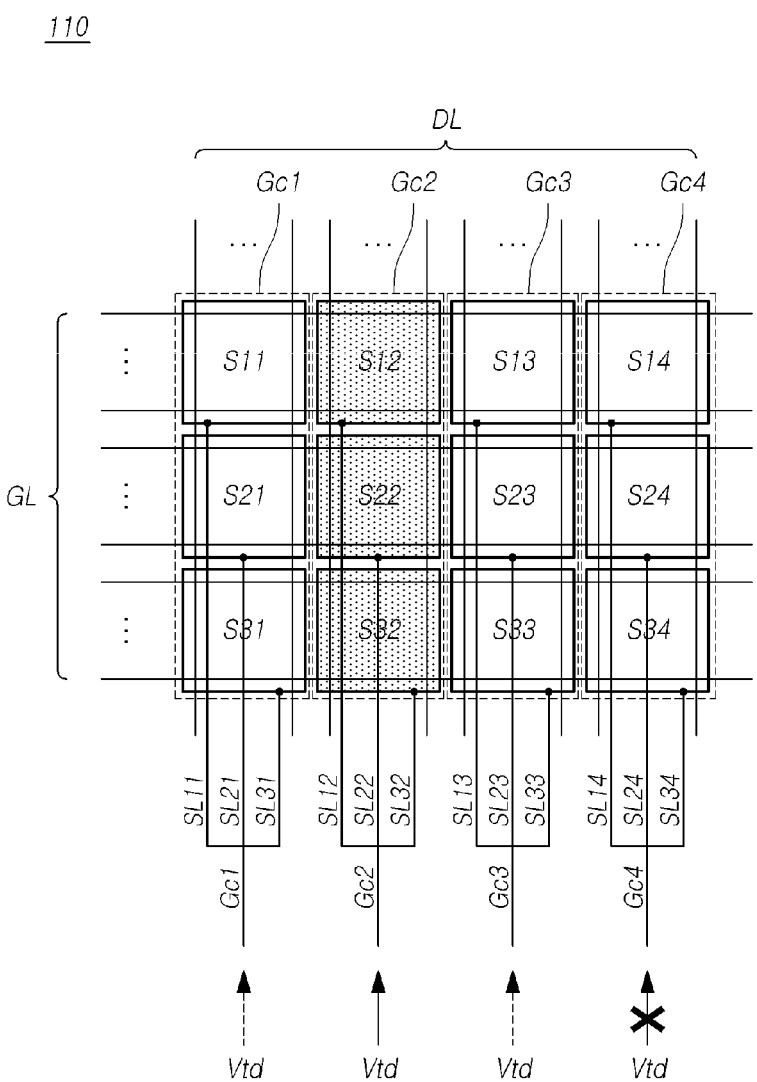
Figure 11:
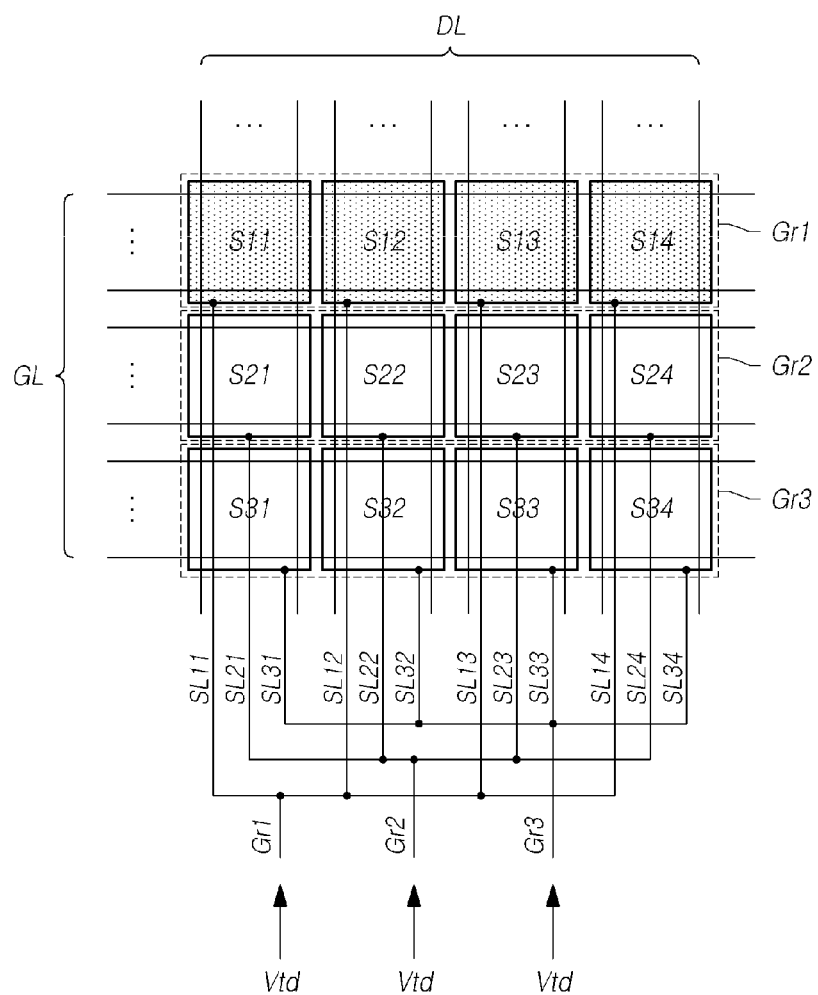
FIG. 11 and FIG. 12 are views showing a method of applying a touch drive signal to touch electrodes in the display device integrated with a touch screen panel according to an exemplary embodiment, when touch sensing is performed according to the touch electrode rows (row-wise touch electrode groups)
Figure 12:
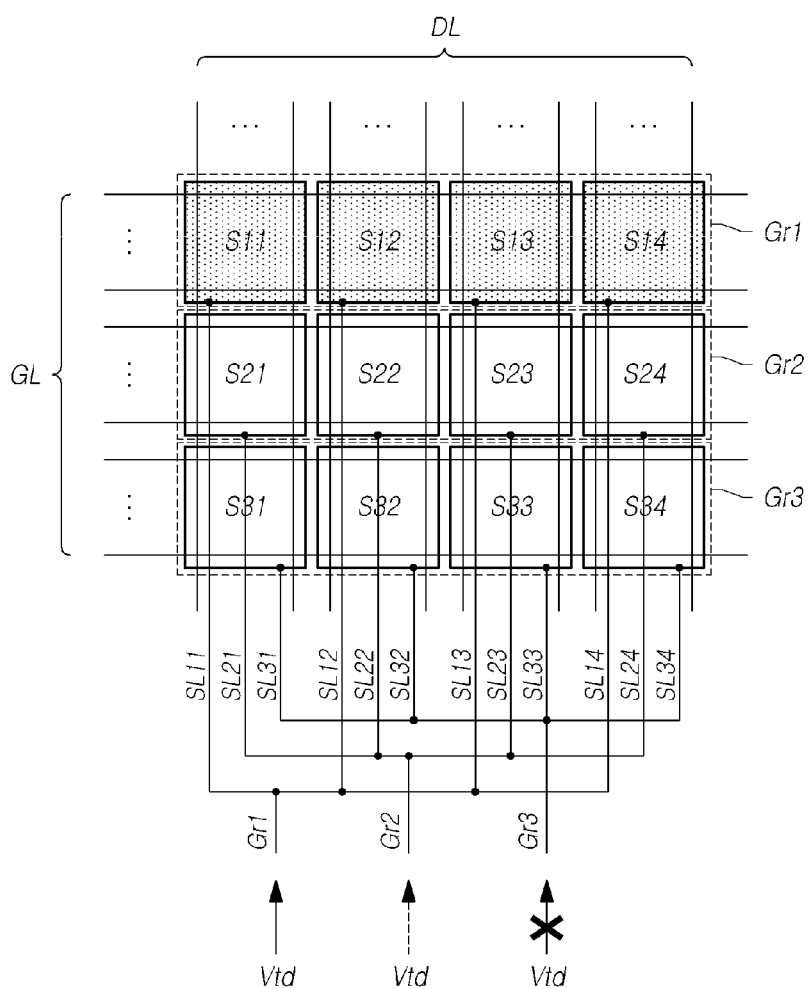

Here, FIG. 9 and FIG. 10 are views showing the case in which the plurality of electrodes S11 to S14, S21 to S24 and S31 to S34 functioning as the touch electrodes are grouped in a column such that touch sensing is performed along the column, and FIG. 11 and FIG. 12 are views showing the case in which the plurality of electrodes S11 to S14, S21 to S24 and S31 to S34 functioning as the touch electrodes are grouped in a row such that touch sensing is performed along the row.

Before a description with reference to the figures, a brief discussion will be given to a method of applying the touch drive signal Vtd to the plurality of electrodes S11 to S14, S21 to S24 and S31 to S34 functioning as the touch electrodes when the driving mode is the touch driving mode.

When the driving mode is the touch driving mode, the touch IC 140 can apply the touch drive signal to all of the plurality of electrodes S11 to S14, S21 to S24 and S31 to S34 which function as the touch electrodes or parts of the plurality of electrodes S11 to S14, S21 to S24 and S31 to S34.

When the touch IC 140 applies the touch drive signal to parts of the plurality of electrodes S11 to S14, S21 to S24 and S31 to S34, the touch IC 140 sequentially selects one electrode group from among the plurality of electrode groups, which is grouped from the plurality of electrodes S11 to S14, S21 to S24 and S31 to S34, as a "touch sensing electrode group" and applies the touch drive signal to the touch sensing electrode group.

Here, the touch IC 140 can further apply the touch drive signal to at least one electrode group adjacent to the touch sensing electrode group in order to improve the accuracy of touch sensing.

FIG. 9 and FIG. 10 show a method of applying the touch drive signal to the touch electrodes S11 to S14, S21 to S24 and S31 to S34 in the touch screen integrated display device 100 according to an exemplary embodiment when touch sensing is performed according to the touch electrode columns (column-wise touch electrode groups Gc1, Gc2, Gc3 and Gc4).

FIG. 9 and FIG. 10 show an example in which the touch electrode group Gc2 including S12, S22 and S32 from among the four column-wise touch electrode groups Gc1 to Gc4 is the touch sensing electrode group (group of electrodes in the same column line) in which touch sensing is performed.

Referring to FIG. 9, the touch drive signal Vtd can be applied to all of the plurality of electrodes S11 to S14, S21 to S24 and S31 to S34 through the signal lines SL11, SL21, SL31, SL12, SL22, SL32, SL13, SL23, SL33, SL14, SL24 and SL34. That is, the touch drive signal Vtd can be applied to all of the four column-wise touch electrode groups Gc1 to Gc4.

As another application method, as shown in FIG. 10, the touch drive signal can be applied to parts of the plurality of electrodes S11 to S14, S21 to S24 and S31 to S34.

More specifically, referring to FIG. 10, the touch drive signal is applied to the electrodes S12, S22 and S32 of the touch sensing electrode group Gc2 through the corresponding signal lines SL12, SL22 and SL32.

Here, the touch drive signal may not be applied to the electrodes S11, S21, S31, S13, S23, S33, S14, S24 and S34 of the other electrode groups Gc1, Gc3 and Gc4, but may be applied to the touch sensing electrode group Gc2.

In addition, referring to FIG. 10, the touch drive signal can be applied concurrently to the electrodes S12, S22 and S32 of the touch sensing electrode group Gc2 in order to increase the efficiency of touch sensing and the electrodes S11, S21, S31, S13, S23 and S33 of the electrode groups Gc1 and Gc3 adjacent to the touch sensing electrode group Gc2.

In this case, the touch drive signal is not applied to the electrodes S14, S24 and S34 of the electrode group Gc4 which is not adjacent to the touch sensing electrode group Gc2.

FIG. 11 and FIG. 12 show a method of applying the touch drive signal to the touch electrodes S11 to S14, S21 to S24 and S31 to S34 in the touch screen integrated display device 100 according to an exemplary embodiment when touch sensing is performed according to the touch electrode rows (row-wise touch electrode groups Gr1, Gr2 and Gr3).

FIG. 11 and FIG. 12 show an example in which the touch electrode group Gr1 including S11, S12, S13 and S14 from among the three row-wise touch electrode groups Gr1 to Gr3 is the touch sensing electrode group (group of electrodes in the same row line) in which touch sensing is performed.

Referring to FIG. 11, the touch drive signal Vtd can be applied to all of the plurality of electrodes S11 to S14, S21 to S24 and S31 to S34 through the signal lines SL11, SL21, SL31, SL12, SL22, SL32, SL13, SL23, SL33, SL14, SL24 and SL34. That is, the touch drive signal Vtd can be applied to all of the three row-wise touch electrode groups Gr1 to Gr3.

As another application method, as shown in FIG. 12, the touch drive signal Vtd can be applied to parts of the plurality of electrodes S11 to S14, S21 to S24 and S31 to S34.

More specifically, referring to FIG. 12, the touch drive signal is applied to the electrodes S11, S12, S13 and S14 of the touch sensing electrode group Gr1 through the corresponding signal lines SL11, SL12, SL13 and SL14.

Here, the touch drive signal may not be applied to the electrodes S21, S22, S23, S24, S31, S32, S33 and S34 of the other electrodes groups Gr2 and Gr3 than the touch sensing electrode group Gr1.

In addition, referring to FIG. 12, the touch drive signal can be applied concurrently to the electrodes S11, S12, S13 and S14 of the touch sensing electrode group Gr1 and the electrodes S21, S22, S23 and S24 of the electrode group Gr2 adjacent to the touch sensing electrode group Gr1 in order to increase the efficiency of touch sensing.

In this case, the touch drive signal is not applied to the electrodes S31, S32, S33 and S34 of the electrode group Gr3 which is not adjacent to the touch sensing electrode group Gr1.

Since the touch drive signal is applied to parts of the plurality of electrodes S11 to S14, S21 to S24 and S31 to S34 which functions as the touch electrodes as described above with reference to FIG. 9 to FIG. 12, it is possible to reduce power consumed by the touch screen integrated display device 100.

Referring to FIG. 13 to FIG. 16, a description will be given below of a method of applying a touch drive signal to the data lines and the gate lines when the driving mode is the touch driving mode.

Figure 13:
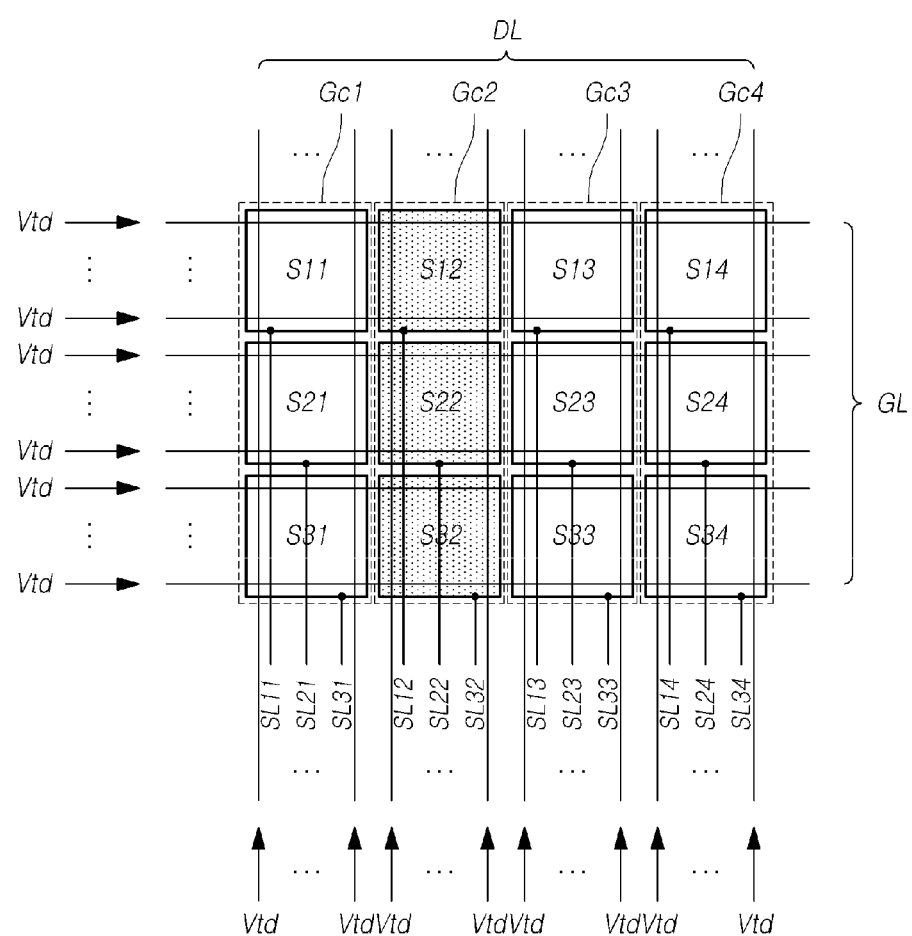
FIG. 13 and FIG. 14 are views showing a method of applying a touch drive signal to data lines and gate lines in the display device integrated with a touch screen panel according to an exemplary embodiment, when touch sensing is performed according to the touch electrode columns (column-wise touch electrode groups)
Figure 14:
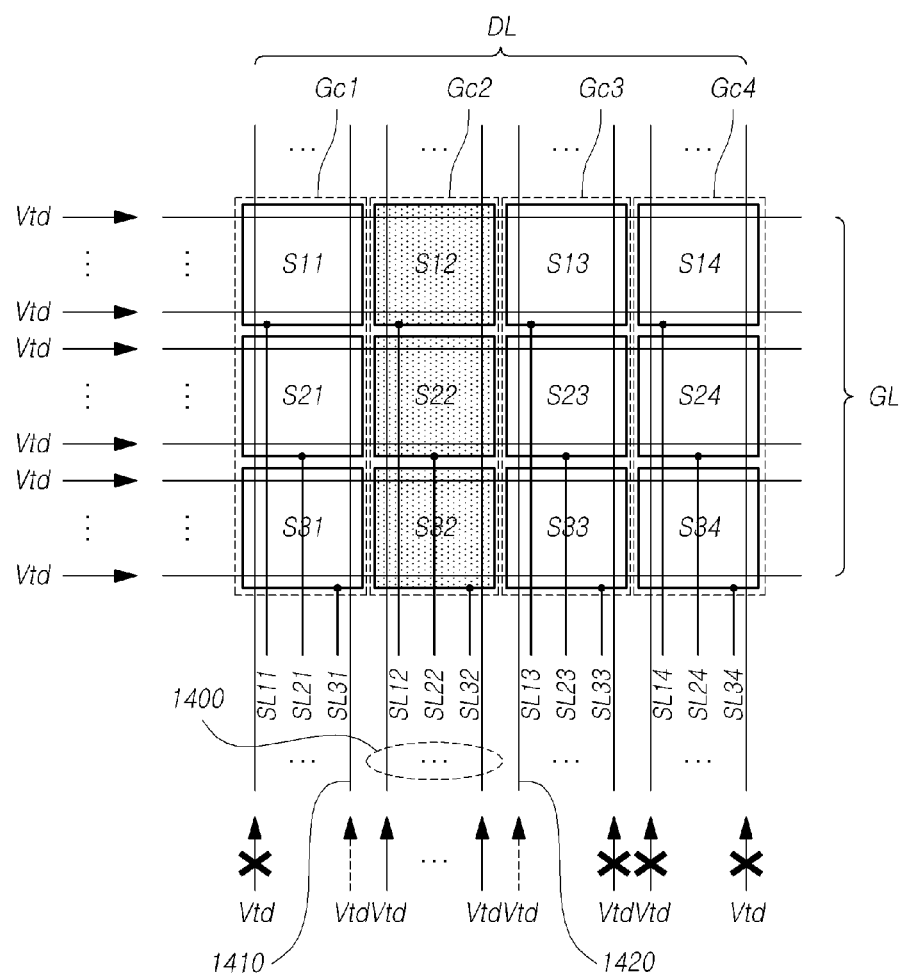

FIG. 13 and FIG. 14 are views showing a method of applying the touch drive signal to the data lines and the gate lines in the touch screen integrated display device 100 according to an exemplary embodiment when touch sensing is performed according to the touch electrode columns (column-wise touch electrode groups).

FIG. 13 and FIG. 14 show an example in which the touch electrode group Gc2 including S12, S22 and S32 from among the four column-wise touch electrode groups Gc1 to Gc4 is the touch sensing electrode group (group of electrodes in the same column line) in which touch sensing is performed.

Referring to FIG. 13, the data driver unit 120 and/or the gate driver unit 130 can apply the touch drive signal Vtd or a signal corresponding to the touch drive signal to all of the plurality of data lines DL and/or the plurality of gate lines GL formed on the panel 110 in order to prevent parasitic capacitance Cpara. That is, the touch drive signal Vtd or the corresponding signal can be applied to all of the plurality of data lines DL and/or the plurality of gate lines GL corresponding to the four column-wise touch electrode groups Gc1 to Gc4.

As another application method, referring to FIG. 14, when the driving mode is the touch driving mode, the data driver unit 120 can apply the touch drive signal Vtd or the signal corresponding to the touch drive signal to parts of the plurality of data lines DL.

Referring to FIG. 14, when the data driver unit 120 applies the touch drive signal or the signal corresponding to the touch drive signal to parts of the plurality of data lines DL, the touch drive signal or the signal corresponding to the touch drive signal can be applied to at least one data line 1400 corresponding to the touch sensing electrode group Gc2 selected from among the plurality of electrode groups Gc1 to Gc4. This partial application method can significantly reduce power consumption than the method shown in FIG. 13 in which the signal is applied to all of the data lines.

In addition, referring to FIG. 14, when the data driver unit 120 applies the touch drive signal or the signal corresponding to the touch drive signal to at least one data line 1400 corresponding to the touch sensing electrode group Gc2, the data driver unit 120 can further apply the touch drive signal or the signal corresponding to the touch drive signal to at least one data line 1410 and 1420 corresponding to the electrode groups Gc1 and Gc3 adjacent to the touch sensing electrode group Gc2. This can consequently further improve the accuracy of touch sensing.

As shown in FIG. 14, when the data driver unit 120 applies the touch drive signal or the signal corresponding to the touch drive signal to parts of the plurality of data lines DL, the touch drive signal or the signal corresponding to the touch drive signal can be applied to all of the plurality of gate lines GL through the gate driver unit 130.

As shown in FIG. 14, when the data driver unit 120 applies the touch drive signal or the signal corresponding to the touch drive signal to parts of the plurality of data lines DL, each of the plurality of electrode groups Gc1 to Gc4 is a group of two or more electrodes arranged in the same column in the first direction from among the plurality of electrodes S11 to S14, S21 to S24 and S31 to S34.

Figure 15:
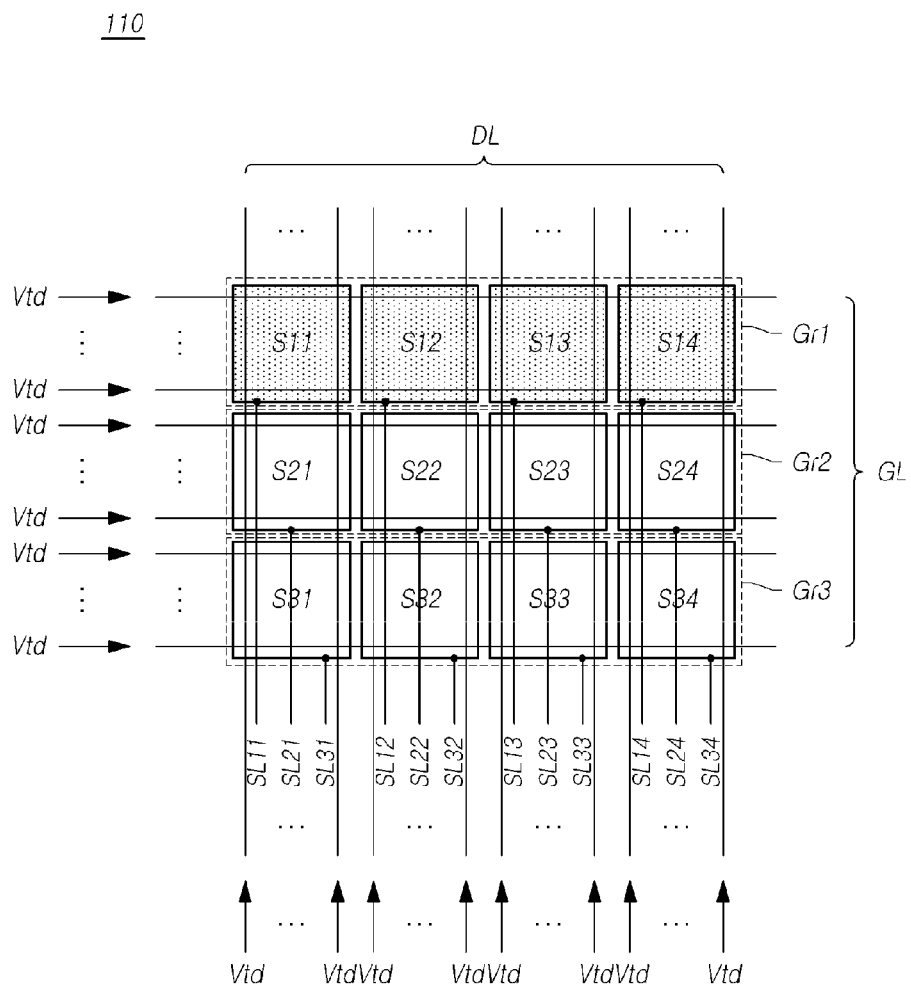
FIG. 15 and FIG. 16 are views showing a method of applying a touch drive signal to data lines and gate lines in the display device integrated with a touch screen panel according to an exemplary embodiment, when touch sensing is performed according to the touch electrode rows (row-wise touch electrode groups)
Figure 16:
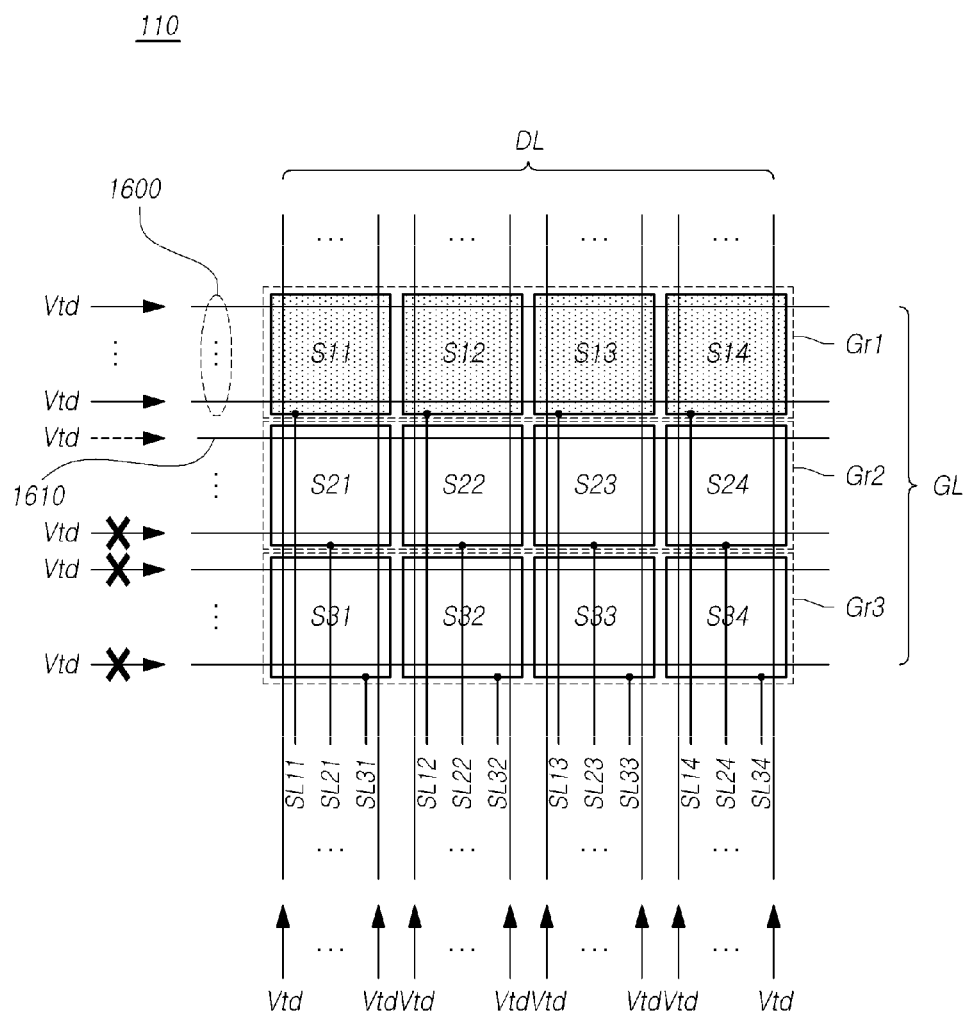

FIG. 15 and FIG. 16 are views showing a method of applying a touch drive signal to the data lines and the gate lines in the touch screen integrated display device 100 according to an exemplary embodiment when touch sensing is performed according to the touch electrode rows (row-wise touch electrode groups Gr1, Gr2 and Gr3).

FIG. 15 and FIG. 16 show an example in which the touch electrode group Gr1 including S11, S12, S13 and S14 from among the three row-wise touch electrode groups Gr1 to Gr3 is the touch sensing electrode group (group of electrodes in the same row line) in which touch sensing is performed.

Referring to FIG. 15, the data driver unit 120 and/or the gate driver unit 130 can apply the touch drive signal Vtd or a signal corresponding to the touch drive signal to all of the plurality of data lines DL and/or the plurality of gate lines GL formed on the panel 110 in order to prevent parasitic capacitance Cpara. That is, the touch drive signal Vtd or the corresponding signal can be applied to all of the plurality of data lines DL and/or the plurality of gate lines GL corresponding to the three row-wise touch electrode groups Gr1 to Gr3.

As another application method, referring to FIG. 16, when the driving mode is the touch driving mode, the gate driver unit 130 can apply the touch drive signal or the signal corresponding to the touch drive signal to parts of the plurality of gate lines GL.

Referring to FIG. 16, when the gate driver unit 130 applies the touch drive signal or the signal corresponding to the touch drive signal to parts of the plurality of gate lines GL, the touch drive signal or the signal corresponding to the touch drive signal can be applied to at least one gate line 1600 corresponding to the touch sensing electrode group Gr1 selected from among the plurality of electrode groups Gr1 to Gr3. This partial application method can significantly reduce power consumption than the method shown in FIG. 15 in which the signal is applied to all of the gate lines.

In addition, referring to FIG. 16, when the gate driver unit 130 applies the touch drive signal or the signal corresponding to the touch drive signal to at least one gate line 1600 corresponding to the touch sensing electrode group Gr1, the gate driver unit 130 can further apply the touch drive signal or the signal corresponding to the touch drive signal to at least one gate line 1610 corresponding to the electrode group Gr2 adjacent to the touch sensing electrode group Gr1. This can consequently further improve the accuracy of touch sensing.

As shown in FIG. 16, when the gate driver unit 130 applies the touch drive signal or the signal corresponding to the touch drive signal to parts of the plurality of gate lines GL, the touch drive signal or the signal corresponding to the touch drive signal can be applied to all of the plurality of data lines DL through the data driver unit 120.

As shown in FIG. 16, when the gate driver unit 130 applies the touch drive signal or the signal corresponding to the touch drive signal to parts of the plurality of gate lines GL, each of the plurality of electrode groups Gr1 to Gr3 is a group of two or more electrodes arranged in the same row in the second direction from among the plurality of electrodes S11 to S14, S21 to S24 and S31 to S34.

FIG. 17 is a top-plan view showing a unit touch electrode area where an electrode S11 is formed in the touch screen integrated display device 100 according to an exemplary embodiment when each of the plurality of electrodes S11 to S14, S21 to S24 and S31 to S34 functioning as the touch electrodes is a pattern including finger-shaped portions.

Each of the plurality of electrodes S11 to S14, S21 to S24 and S31 to S34 which can function as both the common electrodes and the touch electrodes can be a pattern including finger-shaped portions like the electrode S11 shown in FIG. 17 in order to achieve a high aperture ratio, a wide viewing angle, etc., although it can be a block-shaped pattern, as shown in FIG. 1 to FIG. 16.

FIG. 18 is a cross-sectional view showing the unit touch electrode area in the touch screen integrated display device 100 according to an exemplary embodiment when each of the plurality of electrodes S11 to S14, S21 to S24 and S31 to S34 functioning as the touch electrodes is a pattern including finger-shaped portions.

Referring to FIG. 18, in the panel 110 of the touch screen integrated display device 100 according to an exemplary embodiment, for example, a gate line 1802 is formed in the second direction (in a row, which is in the right and left direction in FIG. 18) on a lower substrate 1800, and a gate insulating layer 1804 is formed thereon.

A data line 1806 is formed in the first direction (in a column, which is in the direction perpendicular to the paper surface in FIG. 18) on the gate insulating layer 1804, and a first passivation layer 408 is formed thereon.

Pixel electrodes 1810 of each pixel area and signal lines 1812 are formed on the first passivation layer 1808, and a second passivation layer 1814 can be formed thereon. The signal lines 1812 are respectively connected from the plurality of electrodes S11 to S14, S21 to S24 and S31 to S34, which functions as the common electrodes and the touch electrodes, to the touch IC 140, and transfer a touch drive signal in the touch driving mode.

One electrode 1816 functioning as common and touch electrodes is formed on the second passivation layer 1814, and a liquid crystal layer 1818 is formed thereon. The electrode 1816 functioning as the common and touch electrodes is one electrode of the plurality of electrodes S11 to S14, S21 to S24 and S31 to S34, and the finger-shaped portions thereof are shown as being divided from each other in FIG. 18.

An upper substrate 1820 on which a black matrix, a color filter and the like are to be formed is positioned on the liquid crystal layer 1818.

According to the present disclosure as set forth above, it is possible to provide the touch screen integrated display device 100 and the method of driving the same which can prevent parasitic capacitance that would otherwise increase the load during a touch operation, lower the accuracy of touch sensing, or make touch sensing impossible.

In addition, the present invention can provide the medium-sized or large touch screen integrated display device 100, the production of which has been impossible due to parasitic capacitance.

The foregoing descriptions and the accompanying drawings have been presented in order to explain the certain principles of the present disclosure. A person skilled in the art to which the invention relates can make many modifications and variations by combining, dividing, substituting for or changing elements without departing from the principle of the disclosure. The foregoing embodiments disclosed herein shall be interpreted as illustrative only not as limitative of the principle and scope of the disclosure. It should be understood that the scope of the disclosure shall be defined by the appended Claims and all of their equivalents.

What is claimed is:
1. A touch sensitive display device comprising:
a display panel including a plurality of electrodes and a plurality of display pixels defined at intersections of a plurality of display lines of the display panel;
wherein the touch sensitive display device is configured to operate in a plurality of modes including:
a display driving mode, in which one or more of the electrodes are driven by a common voltage signal and display control signals are applied to the display lines to display images on the display pixels, and a touch driving mode, wherein one or more of the electrodes are driven by a touch drive signal, and one or more of the display lines are driven by a signal that is offset from the touch drive signal by a DC offset voltage.

2. The touch sensitive display device of claim 1, wherein the signal provided to said one or more of the display lines during the touch driving mode is substantially in-phase with the touch drive signal.

3. The touch sensitive display device of claim 1, wherein an amplitude range of the signal provided to said one or more of the display lines during the touch driving mode is substantially equal to an amplitude range of the touch drive signal.

4. The touch sensitive display device of claim 1, wherein the display lines are gate lines of the display panel and the signal provided to said one or more of the display lines during the touch driving mode turns off transistors of display pixels driven by the respective gate lines.

5. The touch sensitive display device of claim 1, wherein the DC offset voltage is a positive voltage.

6. The touch sensitive display device of claim 5, wherein the signal provided to said one or more of the display lines is offset from the touch drive signal by the DC offset voltage that is constant during an entire duration of the touch drive signal.

7. The touch sensitive display device of claim 1, wherein the DC offset voltage is a negative voltage.

8. The touch sensitive display device of claim 7, wherein the signal provided to said one or more of the display lines is offset from the touch drive signal by the DC offset voltage that is constant during an entire duration of the touch drive signal.

9. A driver circuit for driving a touch sensitive display device, the touch sensitive display device comprising a display panel including a plurality of electrodes and a plurality of display pixels defined at intersections of a plurality of display lines of the display panel, the driver circuit comprising:
    circuitry to operate the touch sensitive display device in a plurality of modes including:
    a display driving mode, in which one or more of the electrodes are driven by a common voltage signal and display control signals are applied to the display lines to display images on the display pixels, and
    a touch driving mode, wherein one or more of the electrodes are driven by a touch drive signal, and one or more of the display lines are driven by a signal that is offset from the touch drive signal by a DC offset voltage.

10. The driver circuit of claim 9, wherein the signal provided to said one or more of the display lines during the touch driving mode is substantially in-phase with the touch drive signal.

11. The driver circuit of claim 9, wherein an amplitude range of the signal provided to said one or more of the display lines during the touch driving mode is substantially equal to an amplitude range of the touch drive signal.

12. The driver circuit of claim 9, wherein the display lines are gate lines of the display panel and the signal provided to said one or more of the display lines during the touch driving mode turns off transistors of display pixels driven by the respective gate lines.

13. The driver circuit of claim 9, wherein the DC offset voltage is a positive voltage.

14. The driver circuit of claim 13, wherein the signal provided to said one or more of the display lines is offset from the touch drive signal by the DC offset voltage that is constant during an entire duration of the touch drive signal.

15. The driver circuit of claim 9, wherein the DC offset voltage is a negative voltage.

16. The driver circuit of claim 15, wherein the signal provided to said one or more of the display lines is offset from the touch drive signal by the DC offset voltage that is constant during an entire duration of the touch drive signal.

17. A method for driving a touch sensitive display device, the touch sensitive display device comprising a display panel including a plurality of electrodes and a plurality of display pixels defined at intersections of a plurality of display lines of the display panel, the method comprising:
    driving the touch sensitive display device in a display driving mode, in which one or more of the electrodes are driven by a common voltage signal and display control signals are applied to the display lines to display images on the display pixels; and
    driving the touch sensitive display device in a touch driving mode, wherein one or more of the electrodes are driven by a touch drive signal, and one or more of the display lines are driven by a signal that is offset from the touch drive signal by a DC offset voltage.

18. The method of claim 17, wherein the signal provided to said one or more of the display lines during the touch driving mode is substantially in-phase with the touch drive signal.

19. The method of claim 17, wherein an amplitude range of the signal provided to said one or more of the display lines during the touch driving mode is substantially equal to an amplitude range of the touch drive signal.

20. The method of claim 17, wherein the display lines are gate lines of the display panel and the signal provided to said one or more of the display lines during the touch driving mode turns off transistors of display pixels driven by the respective gate lines.

21. The method of claim 17, wherein the DC offset voltage is a positive voltage.

22. The method of claim 21, wherein the signal provided to said one or more of the display lines is offset from the touch drive signal by the DC offset voltage that is constant during an entire duration of the touch drive signal.

23. The method of claim 17, wherein the DC offset voltage is a negative voltage.

24. The method of claim 23, wherein the signal provided to said one or more of the display lines is offset from the touch drive signal by the DC offset voltage that is constant during an entire duration of the touch drive signal.

* * * * *